US012659950B2

(12) United States Patent (10) Patent No.: US 12,659,950 B2
Jiao et al. (45) Date of Patent: Jun. 16, 2026

(54) PUCCH TRANSMISSION METHOD AND APPARATUS

(71) Applicant: Huawei Technologies Co., Ltd., Shenzhen (CN)

(72) Inventors: Shurong Jiao, Shanghai (CN); Jun Li, Shanghai (CN); Meng Hua, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 278 days.

(21) Appl. No.: 18/352,885

(22) Filed: Jul. 14, 2023

(65) Prior Publication Data

US 2023/0362928 A1 Nov. 9, 2023

Related U.S. Application Data

(63) Continuation of application No. PCT/CN2021/106305, filed on Jul. 14, 2021.

(30) Foreign Application Priority Data

Jan. 15, 2021 (WO) ................ PCT/CN2021/072233

(51) Int. Cl.
*H04W 72/1268* (2023.01)
(52) U.S. Cl.
CPC .............................. *H04W 72/1268* (2013.01)
(58) Field of Classification Search
CPC .. H04W 72/1268; H04W 72/23; H04L 5/001; H04L 5/0094
See application file for complete search history.

(56) References Cited

U.S. PATENT DOCUMENTS

2016/0192388 A1* 6/2016 Ekpenyong ........... H04L 5/0092
370/329
2020/0178248 A1 6/2020 Wen et al.
2020/0305158 A1* 9/2020 Shim ..................... H04L 5/0094
2020/0313831 A1* 10/2020 Kim ........................ H04L 5/001
(Continued)

FOREIGN PATENT DOCUMENTS

CN 103391583 A 8/2016
CN 105991212 A 10/2016
CN 106559187 A 4/2017
(Continued)

OTHER PUBLICATIONS

3rd Generation Partnership Project; Technical Specification Group Radio Access Network; NR; Multiplexing and Channel Coding (Release 16), 3GPP TS 38.212, Dec. 2020, 152 Pages, V16.4.0.
(Continued)

*Primary Examiner* — Brandon J Miller
(74) *Attorney, Agent, or Firm* — Slater Matsil, LLP

(57) ABSTRACT

This application discloses an apparatus for a physical uplink control channel (PUCCH) transmission. The apparatus is configured to obtain M cells that have a PUCCH transmission capability in a PUCCH group, receive, from a network device, first indication information indicating a first cell in the M cells, and receive, from the network device, second indication information indicating a time domain position of a first PUCCH. The terminal sends the first PUCCH to the network device on the first cell.

16 Claims, 5 Drawing Sheets

(56)　　　　　　References Cited

U.S. PATENT DOCUMENTS

2021/0105126 A1 *　4/2021　Yi ......................... H04W 76/27
2021/0314937 A1 *　10/2021　Huang ................... H04L 5/001

FOREIGN PATENT DOCUMENTS

| | | | |
|---|---|---|---|
| CN | 111988120 | A | 11/2020 |
| CN | 112118627 | A | 12/2020 |
| WO | 20189224493 | A1 | 12/2018 |
| WO | WO-2019133039 | A1 * | 7/2019 ............ H03M 13/13 |

OTHER PUBLICATIONS

3rd Generation Partnership Project; Technical Specification Group
Radio Access Network; NR; Physical Later Procedures for Control
(Release 16), 3GPP TS 38.213, Dec. 2020, 181 Pages, V16.4.0.
3rd Generation Partnership Project; Technical Specification Group
Radio Access Network; NR: Radio Resource Control (RRC) Pro-
tocol Specification (Release 16), 3GPP TS 38.331, Jan. 2021, 932
Pages, V16.3.1.
Lenovo et al., "HARQ-ACK Feedback Enhancement for IIoT/
URLLC," 3GPP TSG RAN WG1#103-e, e-Meeting, R1-2009101,
Oct. 26-Nov. 13, 2020, 3 pages.

* cited by examiner

PUCCH TRANSMISSION METHOD AND APPARATUS

CROSS-REFERENCE TO RELATED APPLICATIONS

This application is a continuation of International Patent Application No. PCT/CN2021/106305, filed on Jul. 14, 2021, which claims priority to International Patent Application No. PCT/CN2021/072233, filed on Jan. 15, 2021. The disclosure of the aforementioned applications are hereby incorporated by reference in their entireties.

TECHNICAL FIELD

This application relates to the field of wireless communication, and in particular, to a physical uplink control channel (PUCCH) transmission method and an apparatus.

BACKGROUND

In a communication system, before communicating with a terminal, a network device configures at least one PUCCH group (PUCCH group) for the terminal. Each PUCCH group includes a plurality of carriers, and each carrier corresponds to one cell (cell). For a time division duplex (TDD) system, a frame format of one carrier may include at least one of an uplink slot, a downlink slot, or a flexible slot. The uplink slot is used to transmit uplink data. The downlink slot is used to transmit downlink data. The flexible slot can be used to transmit both uplink data and downlink data.

The terminal may send a PUCCH to the network device in the uplink slot or the flexible slot. The PUCCH may carry uplink control information (UCI) such as hybrid automatic repeat request-acknowledgement (hybrid automatic repeat request-acknowledgement, HARQ-ACK) information. Currently, the PUCCH can be transmitted only on one preset carrier in the PUCCH group. If in a frame format configured by the network device for the carrier, there are a large quantity of downlink slots and a small quantity of uplink slots or flexible slots, the terminal needs to wait for long time before sending the PUCCH once. To resolve a problem that the terminal cannot send the PUCCH in a timely manner, it is proposed that the PUCCH may be transmitted on a carrier other than the preset carrier in the PUCCH group. In this case, how the terminal determines, from carriers in the PUCCH group, a carrier that is finally used for PUCCH transmission is an urgent problem to be resolved.

SUMMARY

This application provides a PUCCH transmission method and an apparatus, to determine, from carriers in a PUCCH group, a carrier that is finally used for PUCCH transmission.

To achieve the foregoing objectives, the following technical solutions are used in embodiments of this application.

According to a first aspect, an embodiment of this application provides a PUCCH transmission method. The method includes: A terminal obtains M carriers that have a PUCCH transmission capability, where the M carriers are included in a PUCCH group, and M is an integer greater than 1. The terminal receives, from a network device, first indication information indicating a first carrier, where the first carrier is included in the M carriers. The terminal receives, from the network device, second indication information indicating a time domain position of a first PUCCH. The terminal sends the first PUCCH to the network device on the first carrier.

Based on the method provided in the first aspect, the terminal may obtain the M carriers that have the PUCCH transmission capability, determine, from the M carriers based on the first indication information, the first carrier used to transmit the first PUCCH, determine the time domain position of the first PUCCH based on the second indication information, and send the first PUCCH to the network device on the first carrier. In this way, the terminal may determine, from the PUCCH group, the M carriers that can be used for PUCCH transmission, and may further determine, from the M carriers according to an indication of the network device, a carrier that is finally used for PUCCH transmission. It may be understood that the M carriers are a subset of carriers in the PUCCH group. Therefore, indication information indicating the carrier (that is, the first carrier) that is finally used for PUCCH transmission may include a small quantity of bits to indicate any one of the M carriers, so that complexity of the network device and the terminal can be reduced, and signaling overheads can be reduced.

In a possible implementation, there is an association relationship between a quantity of bits occupied by the first indication information and M; or a quantity of bits occupied by the first indication information is determined by the network device.

In a possible implementation, that there is an association relationship between a quantity of bits occupied by the first indication information and M includes: The quantity P of bits occupied by the first indication information satisfies a formula: $P = \lceil \log_2 M \rceil$. Based on the foregoing method, the quantity of bits occupied by the first indication information may be obtained according to the foregoing formula.

In a possible implementation, a quantity Q of carriers that can be indicated by the first indication information is less than M, and the method further includes: The terminal determines at least one second carrier from the M carriers, where a time unit corresponding to the at least one second carrier includes at least R non-downlink symbols at the time domain position indicated by the second indication information, and the first carrier is included in the at least one second carrier. Based on the foregoing method, if the quantity Q of carriers that can be indicated by the first indication information is less than M, the terminal may further determine, from the M carriers, the at least one second carrier that meets a requirement, to make the quantity of carriers that can be indicated by the first indication information be greater than or equal to a quantity of the at least one second carrier.

In a possible implementation, a quantity of the at least one second carrier is greater than Q, and an index of the first carrier in the at least one second carrier is less than or equal to Q. Based on the foregoing method, if the quantity of the at least one second carrier is greater than Q, carriers in the at least one second carrier may be sorted according to a specific rule, and the first indication information may indicate the first Q carriers in the at least one second carrier.

In a possible implementation, the method further includes: The terminal receives third indication information from the network device, where the third indication information indicates a time domain position of a second PUCCH; and the terminal sends the second PUCCH to the network device based on the third indication information. Based on the foregoing method, the terminal may send the second PUCCH to the network device based on the third indication information.

In a possible implementation, that the terminal sends the second PUCCH to the network device based on the third indication information includes: If the second PUCCH and the first PUCCH are located in a same time unit, and a sending moment of the third indication information is earlier than a sending moment of the second indication information, the terminal sends, on the first carrier, the second PUCCH to the network device at the time domain position indicated by the second indication information; or if the second PUCCH and the first PUCCH are located in a same time unit, and a sending moment of the third indication information is later than a sending moment of the second indication information, the terminal sends, on a preset carrier, the second PUCCH to the network device at the time domain position indicated by the third indication information; or if the second PUCCH and the first PUCCH are located in different time units, the terminal sends, on a preset carrier, the second PUCCH to the network device at the time domain position indicated by the third indication information. Based on the foregoing method, the terminal may determine, according to a preset rule, the carrier used to transmit the second PUCCH. In this way, the network device does not need to indicate the carrier used to transmit the second PUCCH. This reduces signaling overheads.

In a possible implementation, the M carriers are activated by the network device; or configuration information for PUCCH transmission is respectively configured for the M carriers; or a time unit corresponding to each of the M carriers includes at least R non-downlink symbols at the time domain position of the first PUCCH, where R is a positive integer. Based on the foregoing method, the terminal may obtain the M carriers in a plurality of manners. This improves diversity and flexibility of obtaining the M carriers by the terminal.

In a possible implementation, the second indication information includes first position information and time interval information, the first position information indicates a time domain position for transmitting a physical downlink shared channel (physical downlink shared channel, PDSCH), and the time interval information indicates a time interval between a moment for transmitting the PDSCH and a moment for transmitting the first PUCCH. Based on the foregoing method, the terminal may obtain the time domain position of the first PUCCH by using the first position information and the time interval information.

In a possible implementation, the configuration information for PUCCH transmission includes a first set, and the first set includes at least one time interval; and quantities of time intervals included in first sets corresponding to the M carriers are the same; or a quantity of bits occupied by the time interval information is determined by a quantity of time intervals included in a second set, and the second set includes a largest quantity of time intervals in first sets corresponding to the M carriers. Based on the foregoing method, the terminal may correctly parse the second indication information, further determine the first position information and the time interval information, and determine the time domain position of the first PUCCH based on the first position information and the time interval information.

According to a second aspect, an embodiment of this application provides a PUCCH transmission method. The method includes: A network device obtains M carriers that have a PUCCH transmission capability, where the M carriers are included in a PUCCH group, and M is an integer greater than 1. The network device sends first indication information to a terminal, where the first indication information indicates a first carrier, and the first carrier is included in the M carriers. The network device sends second indication information to the terminal, where the second indication information indicates a time domain position of a first PUCCH. The network device receives the first PUCCH from the terminal on the first carrier.

Based on the method provided in the second aspect, the network device may obtain the M carriers that have the PUCCH transmission capability, and send the first indication information and the second indication information to the terminal, so that the terminal can determine, from the M carriers according to an indication of the network device, a carrier that is finally used for PUCCH transmission. It may be understood that the M carriers are a subset of carriers in the PUCCH group. Therefore, indication information indicating the carrier (that is, the first carrier) that is finally used for PUCCH transmission may include a small quantity of bits to indicate any one of the M carriers, so that complexity of the network device and the terminal can be reduced, and signaling overheads can be reduced.

In a possible implementation, there is an association relationship between a quantity of bits occupied by the first indication information and M; or a quantity of bits occupied by the first indication information is determined by the network device. Based on the foregoing method, the quantity of bits occupied by the first indication information may be determined in a plurality of manners.

In a possible implementation, that there is an association relationship between a quantity of bits occupied by the first indication information and M includes: The quantity P of bits occupied by the first indication information satisfies a formula: $P = \lceil \log_2 M \rceil$. Based on the foregoing method, the quantity of bits occupied by the first indication information may be obtained according to the foregoing formula.

In a possible implementation, a quantity Q of carriers that can be indicated by the first indication information is less than M, and the method further includes: The network device determines at least one second carrier from the M carriers, where a time unit corresponding to the at least one second carrier includes at least R non-downlink symbols at the time domain position indicated by the second indication information, and the first carrier is included in the at least one second carrier. Based on the foregoing method, if the quantity Q of carriers that can be indicated by the first indication information is less than M, the network device may further determine, from the M carriers, the at least one second carrier that meets a requirement, to make the quantity of carriers that can be indicated by the first indication information be greater than or equal to a quantity of the at least one second carrier.

In a possible implementation, a quantity of the at least one second carrier is greater than Q, and an index of the first carrier in the at least one second carrier is less than or equal to Q. Based on the foregoing method, if the quantity of the at least one second carrier is greater than Q, carriers in the at least one second carrier may be sorted according to a specific rule, and the first indication information may indicate the first Q carriers in the at least one second carrier.

In a possible implementation, the method further includes: The network device sends third indication information to the terminal, where the third indication information indicates a time domain position of a second PUCCH; and the network device receives the second PUCCH from the terminal based on the third indication information. Based on the foregoing method, the network device may receive the second PUCCH from the terminal based on the third indication information.

In a possible implementation, that the network device receives the second PUCCH from the terminal based on the third indication information includes: If the second PUCCH and the first PUCCH are located in a same time unit, and a sending moment of the third indication information is earlier than a sending moment of the second indication information, the network device receives, on the first carrier, the second PUCCH from the terminal at the time domain position of the first PUCCH; or if the second PUCCH and the first PUCCH are located in a same time unit, and a sending moment of the third indication information is later than a sending moment of the second indication information, the network device receives, on a preset carrier, the second PUCCH from the terminal at the time domain position of the second PUCCH; or if the second PUCCH and the first PUCCH are located in different time units, the network device receives, on a preset carrier, the second PUCCH from the terminal at the time domain position of the second PUCCH. Based on the foregoing method, the network device may determine, according to a preset rule, the carrier used to transmit the second PUCCH. In this way, the network device does not need to indicate the carrier used to transmit the second PUCCH. This reduces signaling overheads.

In a possible implementation, the M carriers are activated by the network device; or configuration information for PUCCH transmission is respectively configured for the M carriers; or a time unit corresponding to each of the M carriers includes at least R non-downlink symbols at the time domain position of the first PUCCH, where R is a positive integer. Based on the foregoing method, the network device may obtain the M carriers in a plurality of manners. This improves diversity and flexibility of obtaining the M carriers by the network device.

In a possible implementation, the second indication information includes first position information and time interval information, the first position information indicates a time domain position for transmitting a PDSCH, and the time interval information indicates a time interval between a moment for transmitting the PDSCH and a moment for transmitting the first PUCCH. Based on the foregoing method, the network device may indicate the time domain position of the first PUCCH by using the first position information and the time interval information.

In a possible implementation, the configuration information for PUCCH transmission includes a first set, and the first set includes at least one time interval; and quantities of time intervals included in first sets corresponding to the M carriers are the same; or a quantity of bits occupied by the time interval information is determined by a quantity of time intervals included in a second set, and the second set includes a largest quantity of time intervals in first sets corresponding to the M carriers. Based on the foregoing method, the terminal may correctly parse the second indication information, further determine the first position information and the time interval information, and determine the time domain position of the first PUCCH based on the first position information and the time interval information.

According to a third aspect, an embodiment of this application provides a PUCCH transmission method. The method includes: A terminal obtains M carriers that have a PUCCH transmission capability, where the M carriers are included in a PUCCH group, and M is an integer greater than 1. The terminal receives first indication information from a network device, where the first indication information indicates a time domain position of a PUCCH. The terminal determines a first carrier based on a preset rule and the first indication information, where the first carrier is included in the M carriers. The terminal sends, on the first carrier, the PUCCH to the network device at the time domain position of the PUCCH.

Based on the method provided in the third aspect, the network device may not indicate, to the terminal, the carrier used to transmit the PUCCH, and the network device and the terminal may determine, by using a same rule, the carrier used to transmit the PUCCH, to reduce signaling overheads.

In a possible implementation, that the terminal determines a first carrier based on a preset rule and the first indication information includes: The terminal determines a carrier with a smallest identifier in a first set as the first carrier, where a time unit corresponding to a carrier included in the first set includes at least R non-downlink symbols at the time domain position indicated by the first indication information, and the carrier included in the first set includes a non-downlink symbol at the time domain position indicated by the first indication information; or the terminal sequentially determines each carrier in a second set as the first carrier, where the carrier included in the second set includes a non-downlink symbol at the time domain position indicated by the first indication information; or the terminal determines, as the first carrier based on a correspondence between a time unit and a carrier, a carrier corresponding to a time unit of the time domain position indicated by the first indication information. Based on the foregoing method, the terminal may determine the first carrier in a plurality of manners. This improves diversity and flexibility of determining the first carrier by the terminal.

In a possible implementation, the correspondence between a time unit and a carrier is predefined or configured by the network device.

In a possible implementation, the M carriers are activated by the network device; or configuration information for PUCCH transmission is respectively configured for the M carriers; or a time unit corresponding to each of the M carriers includes at least R non-downlink symbols at the time domain position of the PUCCH, where R is a positive integer. Based on the foregoing method, the terminal may obtain the M carriers in a plurality of manners. This improves diversity and flexibility of obtaining the M carriers by the terminal.

In a possible implementation, the first indication information includes first position information and time interval information, the first position information indicates a time domain position for transmitting a physical downlink shared channel PDSCH, and the time interval information indicates a time interval between a moment for transmitting the PDSCH and a moment for transmitting the first PUCCH. Based on the foregoing method, the terminal may obtain the time domain position of the first PUCCH by using the first position information and the time interval information.

In a possible implementation, the configuration information for PUCCH transmission includes a first set, and the first set includes at least one time interval; and quantities of time intervals included in first sets corresponding to the M carriers are the same; or a quantity of bits occupied by the time interval information is determined by a quantity of time intervals included in a second set, and the second set includes a largest quantity of time intervals in first sets corresponding to the M carriers. Based on the foregoing method, the terminal may correctly parse the second indication information, further determine the first position information and the time interval information, and determine the time domain position of the first PUCCH based on the first position information and the time interval information.

According to a fourth aspect, an embodiment of this application provides a PUCCH transmission method. The method includes: A network device obtains M carriers that have a PUCCH transmission capability, where the M carriers are included in a PUCCH group, and M is an integer greater than 1. The network device sends first indication information to a terminal, where the first indication information indicates a time domain position of a PUCCH. The network device determines a first carrier based on a preset rule and the first indication information, where the first carrier is included in the M carriers. The network device receives, on the first carrier, the PUCCH from the terminal at the time domain position of the PUCCH.

Based on the method provided in the fourth aspect, the network device may not indicate, to the terminal, the carrier used to transmit the PUCCH, and the network device and the terminal may determine, by using a same rule, the carrier used to transmit the PUCCH, to reduce signaling overheads.

In a possible implementation, that the network device determines a first carrier based on a preset rule and the first indication information includes: The network device determines a carrier with a smallest identifier in a first set as the first carrier, where a time unit corresponding to a carrier included in the first set includes at least R non-downlink symbols at the time domain position indicated by the first indication information, and the carrier included in the first set includes a non-downlink symbol at the time domain position indicated by the first indication information; or the network device sequentially determines each carrier in a second set as the first carrier, where the carrier included in the second set includes a non-downlink symbol at the time domain position indicated by the first indication information; or the network device determines, as the first carrier based on a correspondence between a time unit and a carrier, a carrier corresponding to the time domain position indicated by the first indication information. Based on the foregoing method, the network device may determine the first carrier in a plurality of manners. This improves diversity and flexibility of determining the first carrier.

In a possible implementation, the correspondence between a time unit and a carrier is predefined or configured by the network device.

In a possible implementation, the M carriers are activated by the network device; or configuration information for PUCCH transmission is respectively configured for the M carriers; or a time unit corresponding to each of the M carriers includes at least R non-downlink symbols at the time domain position of the PUCCH, where R is a positive integer. Based on the foregoing method, the network device may obtain the M carriers in a plurality of manners. This improves diversity and flexibility of obtaining the M carriers.

In a possible implementation, the first indication information includes first position information and time interval information, the first position information indicates a time domain position for transmitting a PDSCH, and the time interval information indicates a time interval between a moment for transmitting the PDSCH and a moment for transmitting the first PUCCH. Based on the foregoing method, the terminal may obtain the time domain position of the first PUCCH by using the first position information and the time interval information.

In a possible implementation, the configuration information for PUCCH transmission includes a first set, and the first set includes at least one time interval; and quantities of time intervals included in first sets corresponding to the M carriers are the same; or a quantity of bits occupied by the time interval information is determined by a quantity of time intervals included in a second set, and the second set includes a largest quantity of time intervals in first sets corresponding to the M carriers. Based on the foregoing method, the terminal may correctly parse the second indication information, further determine the first position information and the time interval information, and determine the time domain position of the first PUCCH based on the first position information and the time interval information.

According to a fifth aspect, an embodiment of this application provides a PUCCH transmission method. The method includes: A terminal obtains M carriers that have a PUCCH transmission capability, where the M carriers are included in a PUCCH group, and M is an integer greater than 1. The terminal receives first indication information from a network device, where the first indication information indicates a time domain position for transmitting first uplink information. The terminal sends first uplink information to the network device at a first time domain position by using a first carrier, where the first time domain position is determined based on the first indication information, and the first carrier is included in the M carriers.

Based on the method provided in the fifth aspect, the terminal may obtain the M carriers that have the PUCCH transmission capability, and send the first uplink information to the network device on one of the M carriers. In this way, the terminal may determine, from the PUCCH group, the M carriers that can be used for PUCCH transmission, and may further determine, from the M carriers, the carrier used to transmit the first uplink information. It may be understood that the M carriers are a subset of carriers in the PUCCH group. Therefore, complexity of the terminal can be reduced in a manner of determining, from the M carriers, the carrier used to transmit the first uplink information.

In a possible implementation, the method further includes: The terminal receives second indication information from the network device, where the second indication information indicates a second carrier, and the second carrier is included in the M carriers; the terminal receives third indication information from the network device, where the third indication information indicates a time domain position for transmitting second uplink information; and the terminal sends the second uplink information to the network device based on one or more of the first indication information, the second indication information, and the third indication information. Based on the foregoing method, when the terminal has two pieces of uplink information to be sent, the terminal may determine, with reference to time domain positions for respectively transmitting the two pieces of uplink information that are indicated by the network device and the carrier for transmitting the second uplink information that is indicated by the network device, the time domain positions and carriers for transmitting the two pieces of uplink information. In this way, the terminal may determine the time domain positions and the carriers that are suitable for transmitting the two pieces of uplink information.

In a possible implementation, the first time domain position is a time domain position indicated by the first indication information or a time domain position indicated by the third indication information; and the first carrier is a preset carrier, or the first carrier is the same as the second carrier, or the first carrier is determined according to a preset rule. Based on the foregoing method, the terminal may determine the first carrier and the first time domain position in a plurality of manners. This improves diversity and flexibility of determining the first carrier and the first time domain position by the terminal.

In a possible implementation, if the time domain position indicated by the first indication information and the time domain position indicated by the third indication information are in a same time unit, and a sending moment of the third indication information is later than a sending moment of the first indication information, the first time domain position is the time domain position indicated by the third indication information, and the first carrier is the same as the second carrier. That the terminal sends the second uplink information to the network device based on one or more of the first indication information, the second indication information, and the third indication information includes: The terminal sends, on the second carrier, the second uplink information to the network device at the time domain position indicated by the third indication information. Based on the foregoing method, if the time domain position indicated by the first indication information and the time domain position indicated by the third indication information are in the same time unit, and the sending moment of the third indication information is later than the sending moment of the first indication information, the terminal may send, on the second carrier, the first uplink information and the second uplink information to the network device at the time domain position indicated by the third indication information. In other words, the first uplink information and the second uplink information may be sent on a same time-frequency resource, so that resource utilization can be improved.

In a possible implementation, if the time domain position indicated by the first indication information and the time domain position indicated by the third indication information are in a same time unit, and a sending moment of the third indication information is earlier than a sending moment of the first indication information, the first time domain position is the time domain position indicated by the first indication information, and the first carrier is the preset carrier, or the first carrier is determined according to the preset rule. That the terminal sends the second uplink information to the network device based on one or more of the first indication information, the second indication information, and the third indication information includes: The terminal sends, on the first carrier, the second uplink information to the network device at the time domain position indicated by the first indication information. Based on the foregoing method, if the time domain position indicated by the first indication information and the time domain position indicated by the third indication information are in the same time unit, and the sending moment of the third indication information is earlier than the sending moment of the first indication information, the terminal may send, on the first carrier, the first uplink information and the second uplink information to the network device at the time domain position indicated by the first indication information. In other words, the first uplink information and the second uplink information may be sent on a same time-frequency resource, so that resource utilization can be improved.

In a possible implementation, if the time domain position indicated by the first indication information and the time domain position indicated by the third indication information are in a same time unit, the first time domain position is a time domain position indicated by indication information with a later sending moment in the first indication information and the third indication information, and the first carrier is the same as the second carrier. That the terminal sends the second uplink information to the network device based on one or more of the first indication information, the second indication information, and the third indication information includes: The terminal sends, on the second carrier, the second uplink information to the network device at the first time domain position. Based on the foregoing method, if the time domain position indicated by the first indication information and the time domain position indicated by the third indication information are in the same time unit, the terminal may send, on the second carrier, the first uplink information and the second uplink information to the network device at the time domain position indicated by the indication information with the later sending moment in the first indication information and the third indication information. In other words, the first uplink information and the second uplink information may be sent on a same time-frequency resource, so that resource utilization can be improved.

In a possible implementation, if the time domain position indicated by the first indication information and the time domain position indicated by the third indication information are in a same time unit, the first time domain position is a time domain position indicated by indication information with a later sending moment in the first indication information and the third indication information, and the first carrier is the preset carrier, or the first carrier is determined according to the preset rule. That the terminal sends the second uplink information to the network device based on one or more of the first indication information, the second indication information, and the third indication information includes: The terminal sends, on the first carrier, the second uplink information to the network device at the first time domain position. Based on the foregoing method, if the time domain position indicated by the first indication information and the time domain position indicated by the third indication information are in the same time unit, the terminal may send, on the first carrier, the first uplink information and the second uplink information to the network device at the time domain position indicated by indication information with the later sending moment in the first indication information and the third indication information. In other words, the first uplink information and the second uplink information may be sent on a same time-frequency resource, so that resource utilization can be improved.

In a possible implementation, if the time domain position indicated by the first indication information and the time domain position indicated by the third indication information are in a same time unit, the first time domain position is the time domain position indicated by the third indication information, and the first carrier is the same as the second carrier. That the terminal sends the second uplink information to the network device based on one or more of the first indication information, the second indication information, and the third indication information includes: The terminal sends, on the second carrier, the second uplink information to the network device at the time domain position indicated by the third indication information. Based on the foregoing method, if the time domain position indicated by the first indication information and the time domain position indicated by the third indication information are in the same time unit, the terminal may send, on the second carrier, the first uplink information and the second uplink information to the network device at the time domain position indicated by the third indication information. In other words, the first uplink information and the second uplink information may be sent on a same time-frequency resource, so that resource utilization can be improved.

In a possible implementation, if the time domain position indicated by the first indication information and the time domain position indicated by the third indication information are in a same time unit, the first time domain position is the time domain position indicated by the first indication information, and the first carrier is the preset carrier, or the first carrier is determined according to the preset rule. That the terminal sends the second uplink information to the network device based on one or more of the first indication information, the second indication information, and the third indication information includes: The terminal sends, on the first carrier, the second uplink information to the network device at the time domain position indicated by the first indication information. Based on the foregoing method, if the time domain position indicated by the first indication information and the time domain position indicated by the third indication information are in the same time unit, the terminal may send, on the first carrier, the first uplink information and the second uplink information to the network device at the time domain position indicated by the first indication information. In other words, the first uplink information and the second uplink information may be sent on a same time-frequency resource, so that resource utilization can be improved.

In a possible implementation, the first uplink information and the second uplink information are carried on a same PUCCH. Based on the foregoing method, resource utilization can be improved.

In a possible implementation, if the time domain position indicated by the first indication information and the time domain position indicated by the third indication information are in different time units, the first time domain position is the time domain position indicated by the first indication information, and the first carrier is the preset carrier, or the first carrier is determined according to the preset rule. That the terminal sends the second uplink information to the network device based on one or more of the first indication information, the second indication information, and the third indication information includes: The terminal sends, on the second carrier, the second uplink information to the network device at the time domain position indicated by the third indication information. Based on the foregoing method, if the time domain position indicated by the first indication information and the time domain position indicated by the third indication information are in the different time units, the terminal may send the first uplink information and the second uplink information to the network device on different time domain resources or carriers, so that the network device can receive the first uplink information and the second uplink information in a timely manner.

According to a sixth aspect, an embodiment of this application provides a PUCCH transmission method. The method includes: A network device obtains M carriers that have a PUCCH transmission capability, where the M carriers are included in a PUCCH group, and M is an integer greater than 1. The network device sends first indication information to a terminal, where the first indication information indicates a time domain position for transmitting first uplink information. The network device receives, by using a first carrier, the first uplink information from the terminal at a first time domain position, where the first time domain position is determined based on the first indication information, and the first carrier is included in the M carriers.

Based on the method provided in the sixth aspect, the network device may obtain the M carriers that have the PUCCH transmission capability, and receive the first uplink information from the terminal on one of the M carriers. In this way, the network device may determine, from the PUCCH group, the M carriers that can be used for PUCCH transmission, and may further determine, from the M carriers, the carrier used to transmit the first uplink information. It may be understood that the M carriers are a subset of carriers in the PUCCH group. Therefore, complexity of the network device can be reduced in a manner of determining, from the M carriers, the carrier used to transmit the first uplink information.

In a possible implementation, the method further includes: The network device sends second indication information to the terminal, where the second indication information indicates a second carrier, and the second carrier is included in the M carriers; the network device sends third indication information to the terminal, where the third indication information indicates a time domain position for transmitting second uplink information; and the network device receives the second uplink information from the terminal based on one or more of the first indication information, the second indication information, and the third indication information. Based on the foregoing method, when the network device has two pieces of uplink information to be received, the network device may determine, with reference to time domain positions for respectively transmitting the two pieces of uplink information that are indicated by the network device and the carrier for transmitting the second uplink information that is indicated by the network device, the time domain positions and carriers for transmitting the two pieces of uplink information. In this way, the network device may determine the time domain positions and the carriers that are suitable for transmitting the two pieces of uplink information.

In a possible implementation, the first time domain position is a time domain position indicated by the first indication information or a time domain position indicated by the third indication information; and the first carrier is a preset carrier, or the first carrier is the same as the second carrier, or the first carrier is determined according to a preset rule. Based on the foregoing method, the network device may determine the first carrier and the first time domain position in a plurality of manners. This improves diversity and flexibility of determining the first carrier and the first time domain position by the network device.

In a possible implementation, if the time domain position indicated by the first indication information and the time domain position indicated by the third indication information are in a same time unit, and a sending moment of the third indication information is later than a sending moment of the first indication information, the first time domain position is the time domain position indicated by the third indication information, and the first carrier is the same as the second carrier. That the network device receives the second uplink information from the terminal based on one or more of the first indication information, the second indication information, and the third indication information includes: The network device receives, on the second carrier, the second uplink information from the terminal at the time domain position indicated by the third indication information. Based on the foregoing method, if the time domain position indicated by the first indication information and the time domain position indicated by the third indication information are in the same time unit, and the sending moment of the third indication information is later than the sending moment of the first indication information, the network device may receive, on the second carrier, the first uplink information and the second uplink information from the terminal at the time domain position indicated by the third indication information. In other words, the first uplink information and the second uplink information may be sent on a same time-frequency resource, so that resource utilization can be improved.

In a possible implementation, if the time domain position indicated by the first indication information and the time domain position indicated by the third indication information are in a same time unit, and a sending moment of the third indication information is earlier than a sending moment of the first indication information, the first time domain position is the time domain position indicated by the first indication information, and the first carrier is the preset carrier, or the first carrier is determined according to the preset rule. That the network device receives the second uplink information from the terminal based on one or more of the first indication information, the second indication information, and the third indication information includes: The network device receives, on the first carrier, the second uplink information from the terminal at the time domain position indicated by the first indication information. Based on the foregoing method, if the time domain position indicated by the first indication information and the time domain position indicated by the third indication information are in the same time unit, and the sending moment of the third indication information is earlier than the sending moment of the first indication information, the network device may receive, on the first carrier, the first uplink information and the second uplink information from the terminal at the time domain position indicated by the first indication information. In other words, the first uplink information and the second uplink information may be sent on a same time-frequency resource, so that resource utilization can be improved.

In a possible implementation, if the time domain position indicated by the first indication information and the time domain position indicated by the third indication information are in a same time unit, the first time domain position is a time domain position indicated by indication information with a later sending moment in the first indication information and the third indication information, and the first carrier is the same as the second carrier. That the network device receives the second uplink information from the terminal based on one or more of the first indication information, the second indication information, and the third indication information includes: The network device receives, on the second carrier, the second uplink information from the terminal at the first time domain position. Based on the foregoing method, if the time domain position indicated by the first indication information and the time domain position indicated by the third indication information are in the same time unit, the network device may receive, on the second carrier, the first uplink information and the second uplink information from the terminal at the time domain position indicated by the indication information with the later sending moment in the first indication information and the third indication information. In other words, the first uplink information and the second uplink information may be sent on a same time-frequency resource, so that resource utilization can be improved.

In a possible implementation, if the time domain position indicated by the first indication information and the time domain position indicated by the third indication information are in a same time unit, the first time domain position is a time domain position indicated by indication information with a later sending moment in the first indication information and the third indication information, and the first carrier is the preset carrier, or the first carrier is determined according to the preset rule. That the network device receives the second uplink information from the terminal based on one or more of the first indication information, the second indication information, and the third indication information includes: The network device receives, on the first carrier, the second uplink information from the terminal at the first time domain position. Based on the foregoing method, if the time domain position indicated by the first indication information and the time domain position indicated by the third indication information are in the same time unit, the network device may receive, on the first carrier, the first uplink information and the second uplink information from the terminal at the time domain position indicated by the indication information with the later sending moment in the first indication information and the third indication information. In other words, the first uplink information and the second uplink information may be sent on a same time-frequency resource, so that resource utilization can be improved.

In a possible implementation, if the time domain position indicated by the first indication information and the time domain position indicated by the third indication information are in a same time unit, the first time domain position is the time domain position indicated by the third indication information, and the first carrier is the same as the second carrier. That the network device receives the second uplink information from the terminal based on one or more of the first indication information, the second indication information, and the third indication information includes: The network device receives, on the second carrier, the second uplink information from the terminal at the time domain position indicated by the third indication information. Based on the foregoing method, if the time domain position indicated by the first indication information and the time domain position indicated by the third indication information are in the same time unit, the network device may receive, on the second carrier, the first uplink information and the second uplink information from the terminal at the time domain position indicated by the third indication information. In other words, the first uplink information and the second uplink information may be sent on a same time-frequency resource, so that resource utilization can be improved.

In a possible implementation, if the time domain position indicated by the first indication information and the time domain position indicated by the third indication information are in a same time unit, the first time domain position is the time domain position indicated by the first indication information, and the first carrier is a preset carrier, or the first carrier is determined according to a preset rule. That the network device receives the second uplink information from the terminal based on one or more of the first indication information, the second indication information, and the third indication information includes: The network device receives, on the first carrier, the second uplink information from the terminal at the time domain position indicated by the first indication information. Based on the foregoing method, if the time domain position indicated by the first indication information and the time domain position indicated by the third indication information are in the same time unit, the network device may receive, on the first carrier, the first uplink information and the second uplink information from the terminal at the time domain position indicated by the first indication information. In other words, the first uplink information and the second uplink information may be sent on a same time-frequency resource, so that resource utilization can be improved.

In a possible implementation, the first uplink information and the second uplink information are carried on a same PUCCH. Based on the foregoing method, resource utilization can be improved.

In a possible implementation, if the time domain position indicated by the first indication information and the time domain position indicated by the third indication information are in different time units, the first time domain position is the time domain position indicated by the first indication information, and the first carrier is a preset carrier, or the first carrier is determined according to a preset rule. That the network device receives the second uplink information from the terminal based on one or more of the first indication information, the second indication information, and the third indication information includes: The network device receives, on the second carrier, the second uplink information from the terminal at the time domain position indicated by the third indication information. Based on the foregoing method, if the time domain position indicated by the first indication information and the time domain position indicated by the third indication information are in the different time units, the network device may receive the first uplink information and the second uplink information from the terminal on different time domain resources or carriers, so that the network device can receive the first uplink information and the second uplink information in a timely manner.

According to a seventh aspect, an embodiment of this application provides a communication apparatus that can implement the method according to any one of the first aspect or the possible implementations of the first aspect, or can implement the method according to any one of the third aspect or the possible implementations of the third aspect, or can implement the method according to any one of the fifth aspect or the possible implementations of the fifth aspect. The apparatus includes a corresponding unit or component configured to perform the foregoing method. The unit included in the apparatus may be implemented by software and/or hardware. The apparatus may be, for example, a terminal, or a chip, a chip system, or a processor that can support the terminal in implementing the foregoing method.

According to an eighth aspect, an embodiment of this application provides a communication apparatus that can implement the method according to any one of the second aspect or the possible implementations of the second aspect, or can implement the method according to any one of the fourth aspect or the possible implementations of the fourth aspect, or can implement the method according to any one of the sixth aspect or the possible implementations of the sixth aspect. The apparatus includes a corresponding unit or component configured to perform the foregoing method. The unit included in the apparatus may be implemented by software and/or hardware. The apparatus may be, for example, a network device, or a chip, a chip system, or a processor that can support the network device in implementing the foregoing method.

According to a ninth aspect, an embodiment of this application provides a communication apparatus, including a processor. The processor is coupled to a memory, the memory is configured to store a program or instructions, and when the program or the instructions is/are executed by the processor, the apparatus is enabled to implement the method according to any one of the first aspect or the possible implementations of the first aspect, or implement the method according to any one of the third aspect or the possible implementations of the third aspect, or implement the method according to any one of the fifth aspect or the possible implementations of the fifth aspect.

According to a tenth aspect, an embodiment of this application provides a communication apparatus, including a processor. The processor is coupled to a memory, the memory is configured to store a program or instructions, and when the program or the instructions is/are executed by the processor, the apparatus is enabled to implement the method according to any one of the second aspect or the possible implementations of the second aspect, or implement the method according to any one of the fourth aspect or the possible implementations of the fourth aspect, or implement the method according to any one of the sixth aspect or the possible implementations of the sixth aspect.

According to an eleventh aspect, an embodiment of this application provides a communication apparatus. The apparatus is configured to implement the method according to any one of the first aspect or the possible implementations of the first aspect, or configured to implement the method according to any one of the third aspect or the possible implementations of the third aspect, or configured to implement the method according to any one of the fifth aspect or the possible implementations of the fifth aspect.

According to a twelfth aspect, an embodiment of this application provides a communication apparatus. The apparatus is configured to implement the method according to any one of the second aspect or the possible implementations of the second aspect, or configured to implement the method according to any one of the fourth aspect or the possible implementations of the fourth aspect, or configured to implement the method according to any one of the sixth aspect or the possible implementations of the sixth aspect.

According to a thirteenth aspect, an embodiment of this application provides a computer-readable medium. The computer-readable medium stores a computer program or instructions, and when the computer program or the instructions is/are executed, a computer is enabled to perform the method according to any one of the first aspect or the possible implementations of the first aspect, or perform the method according to any one of the third aspect or the possible implementations of the third aspect, or perform the method according to any one of the fifth aspect or the possible implementations of the fifth aspect.

According to a fourteenth aspect, an embodiment of this application provides a computer-readable medium. The computer-readable medium stores a computer program or instructions, and when the computer program or the instructions is/are executed, a computer is enabled to perform the method according to any one of the second aspect or the possible implementations of the second aspect, or perform the method according to any one of the fourth aspect or the possible implementations of the fourth aspect, or perform the method according to any one of the sixth aspect or the possible implementations of the sixth aspect.

According to a fifteenth aspect, an embodiment of this application provides a computer program product. The computer program product includes computer program code, and when the computer program code is run on a computer, the computer is enabled to perform the method according to any one of the first aspect or the possible implementations of the first aspect, or perform the method according to any one of the third aspect or the possible implementations of the third aspect, or perform the method according to any one of the fifth aspect or the possible implementations of the fifth aspect.

According to a sixteenth aspect, an embodiment of this application provides a computer program product. The computer program product includes computer program code, and when the computer program code is run on a computer, the computer is enabled to perform the method according to any one of the second aspect or the possible implementations of the second aspect, or perform the method according to any one of the fourth aspect or the possible implementations of the fourth aspect, or perform the method according to any one of the sixth aspect or the possible implementations of the sixth aspect.

According to a seventeenth aspect, an embodiment of this application provides a chip, including a processor. The processor is coupled to a memory, the memory is configured to store a program or instructions, and when the program or the instructions is/are executed by the processor, the chip is enabled to implement the method according to any one of the first aspect or the possible implementations of the first aspect, or implement the method according to any one of the third aspect or the possible implementations of the third aspect, or implement the method according to any one of the fifth aspect or the possible implementations of the fifth aspect.

According to an eighteenth aspect, an embodiment of this application provides a chip, including a processor. The processor is coupled to a memory, the memory is configured to store a program or instructions, and when the program or the instructions is/are executed by the processor, the chip is enabled to implement the method according to any one of the second aspect or the possible implementations of the second aspect, or implement the method according to any one of the fourth aspect or the possible implementations of the fourth aspect, or implement the method according to any one of the sixth aspect or the possible implementations of the sixth aspect.

According to a nineteenth aspect, an embodiment of this application provides a communication system. The system includes the apparatus according to the seventh aspect and/or the apparatus according to the eighth aspect, or the system includes the apparatus according to the ninth aspect and/or the apparatus according to the tenth aspect, or the system includes the apparatus according to the eleventh aspect and/or the apparatus according to the twelfth aspect, or the system includes the chip according to the seventeenth aspect and/or the chip according to the eighteenth aspect.

It may be understood that any communication apparatus, chip, computer-readable medium, computer program product, communication system, or the like provided above is configured to perform a corresponding method provided above. Therefore, for beneficial effects that can be achieved by the communication apparatus, the chip, the computer-readable medium, the computer program product, the communication system, or the like, refer to the beneficial effects in the corresponding method. Details are not described herein again.

DETAILED DESCRIPTION OF ILLUSTRATIVE EMBODIMENTS

The following describes implementations of embodiments of this application in detail with reference to the accompanying drawings.

A method provided in embodiments of this application may be applied to various communication systems. For example, the communication system may be a long term evolution (long term evolution, LTE) system, a 5th generation (5th generation, 5G) communication system, a wireless fidelity (wireless fidelity, Wi-Fi) system, a 3rd generation partnership project (3rd generation partnership project, 3GPP) related communication system, a future evolved communication system, or a system integrating a plurality of systems. This is not limited. 5G may also be referred to as new radio (new radio, NR). The following uses a communication system 10 shown in FIG. 1 as an example to describe the method provided in embodiments of this application.

Figure 1:
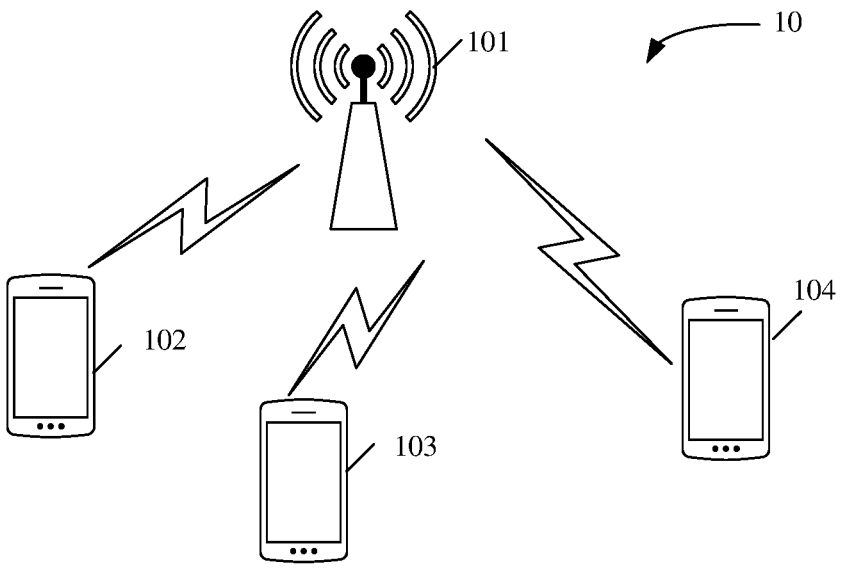
FIG. 1 is a schematic diagram of an architecture of a communication system according to an embodiment of this application.

FIG. 1 is a schematic diagram of an architecture of a communication system 10 according to an embodiment of this application. In FIG. 1, the communication system 10 may include one or more network devices 101 (where only one network device is shown) and a terminal 102 to a terminal 104 that can communicate with the network device 101. FIG. 1 is merely a schematic diagram, and does not constitute a limitation on an applicable scenario of technical solutions provided in this application.

In FIG. 1, the network device may provide a wireless access service for the terminal. Specifically, each network device corresponds to one service coverage area. A terminal that enters the area may communicate with the network device through a Uu interface, to receive a wireless access service provided by the network device. Optionally, the service coverage area may include one or more cells. The terminal and the network device may communicate with each other through a Uu interface link. Uu interface links may be classified into an uplink (uplink, UL) and a downlink (downlink, DL) based on directions of data transmitted through the Uu interface links. Uplink data sent by the terminal to the network device may be transmitted on the UL, and downlink data transmitted by the network device to the terminal may be transmitted on the DL. For example, in FIG. 1, the terminal 103 is located in a coverage area of the network device 101. The network device 101 may send downlink data to the terminal 103 through a DL, and the terminal 103 may send uplink data to the network device 101 through a UL.

The network device in embodiments of this application, for example, the network device 101, may be any device having a wireless transceiver function. The network device includes but is not limited to: an evolved NodeB (NodeB or eNB or e-NodeB, evolved NodeB) in LTE, a base station (gNodeB or gNB) or a transmission reception point (transmission receiving point/transmission reception point, TRP) in NR, a base station that subsequently evolves in 3GPP, an access node in a Wi-Fi system, a wireless relay node, a wireless backhaul node, or the like. A base station may be a macro base station, a micro base station, a picocell base station, a small cell, a relay station, a balloon station, or the like. A plurality of base stations may support networks using a same technology mentioned above, or may support networks using different technologies mentioned above. The base station may include one or more co-site or non-co-site TRPs. The network device may alternatively be a radio controller in a cloud radio access network (cloud radio access network, CRAN) scenario. Alternatively, the network device may be a central unit (central unit, CU) and/or a distributed unit (distributed unit, DU). The network device may alternatively be a server, a wearable device, a machine communication device, a vehicle-mounted device, or the like. In embodiments of this application, an apparatus configured to implement a function of the network device may be a network device, or may be an apparatus, for example, a chip system, that can support the network device in implementing the function. The apparatus may be installed in the network device, or may be used together with the network device. That the network device is a base station is used as an example for description below. The plurality of network devices may be base stations of a same type, or may be base stations of different types. The base station may communicate with a terminal, or may communicate with the terminal through a relay station. The terminal may communicate with a plurality of base stations using different technologies. For example, the terminal may communicate with a base station supporting an LTE network, or may communicate with a base station supporting a 5G network, or may support dual connections to a base station in an LTE network and a base station in a 5G network.

The terminal in embodiments of this application, for example, the terminal 102, the terminal 103, or the terminal 104, is a device having a wireless transceiver function. The terminal may be deployed on land, including an indoor device, an outdoor device, a handheld device, or a vehicle-mounted device; or may be deployed on water (for example, on a ship); or may be deployed in the air (for example, on a plane, a balloon, or a satellite). The terminal may also be referred to as a terminal device. The terminal device may be user equipment (user equipment, UE). The UE includes a handheld device, a vehicle-mounted device, a wearable device, or a computing device having a wireless communication function. For example, the UE may be a mobile phone (mobile phone), a tablet computer, or a computer having a wireless transceiver function. Alternatively, the terminal device may be a virtual reality (virtual reality, VR) terminal device, an augmented reality (augmented reality, AR) terminal device, a wireless terminal in industrial control, a wireless terminal in self-driving, a wireless terminal in telemedicine, a wireless terminal in a smart grid, a wireless terminal in a smart city (smart city), a wireless terminal in a smart home (smart home), or the like. In embodiments of this application, an apparatus configured to implement a function of the terminal may be a terminal, or may be an apparatus, for example, a chip system, that can support the terminal in implementing the function. The apparatus may be installed in the terminal or used together with the terminal. In embodiments of this application, the chip system may include a chip, or may include a chip and another discrete component. In the technical solutions provided in embodiments of this application, the technical solutions provided in embodiments of this application are described by using an example in which the apparatus configured to implement the function of the terminal is the terminal.

The communication system 10 shown in FIG. 1 is merely used as an example, but is not intended to limit the technical solutions in this application. A person skilled in the art should understand that in a specific implementation process, the communication system 10 may further include another device, and a quantity of network devices and a quantity of terminals may alternatively be determined based on a specific requirement. This is not limited.

Optionally, each network element in FIG. 1 in embodiments of this application, for example, the network device 101, the terminal 102, the terminal 103, or the terminal 104, may be a functional module in an apparatus. It may be understood that the functional module may be an element in a hardware device, for example, a communication chip or a communication component in a terminal or a network device, or may be a software functional module run on hardware or a virtualized function instantiated on a platform (for example, a cloud platform).

Figure 2:
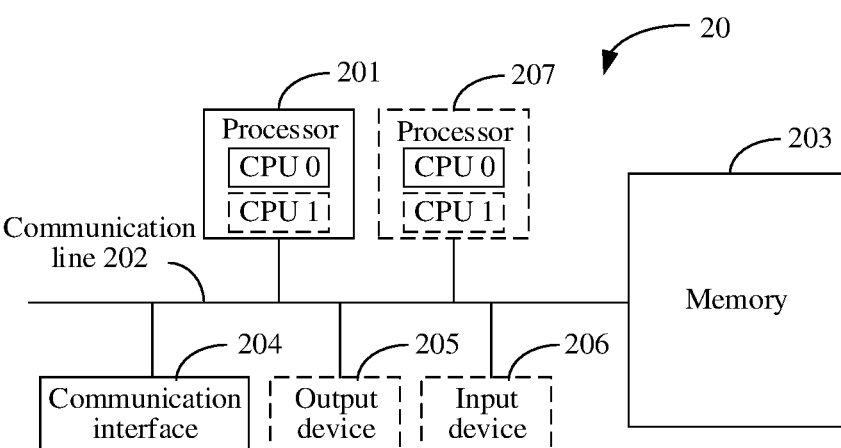
FIG. 2 is a schematic diagram of a hardware structure of a communication apparatus according to an embodiment of this application.

For example, each network element in FIG. 1 may be implemented by a communication apparatus 20 in FIG. 2. FIG. 2 is a schematic diagram of a hardware structure of a communication apparatus that may be used in an embodiment of this application. The communication apparatus 20 includes at least one processor 201 and at least one communication interface 204, and is configured to implement the method provided in embodiments of this application. The communication apparatus 20 may further include a communication line 202 and a memory 203.

The processor 201 may be a general-purpose central processing unit (central processing unit, CPU), a microprocessor, an application-specific integrated circuit (application-specific integrated circuit, ASIC), or one or more integrated circuits configured to control execution of programs in the solutions in this application.

The communication line 202 may include a path, for example, a bus, for transmitting information between the foregoing components.

The communication interface 204 is configured to communicate with another device or a communication network. The communication interface 204 may be any apparatus such as a transceiver, for example, may be an Ethernet interface, a radio access network (radio access network, RAN) interface, a wireless local area network (wireless local area network, WLAN) interface, a transceiver, a pin, a bus, or a transceiver circuit.

The memory 203 may be a read-only memory (read-only memory, ROM), another type of static storage device that can store static information and instructions, a random access memory (random access memory, RAM), or another type of dynamic storage device that can store information and instructions, or may be an electrically erasable programmable read-only memory (electrically erasable programmable read-only memory, EEPROM), a compact disc read-only memory (compact disc read-only memory, CD-ROM) or another compact disc storage, an optical disc storage (including a compact disc, a laser disc, an optical disc, a digital versatile disc, a Blu-ray disc, or the like), a magnetic disk storage medium or another magnetic storage device, or any other medium that can be configured to carry or store expected program code in a form of an instruction structure or a data structure and that is accessible to a computer, but is not limited thereto. The memory may exist independently, and is coupled to the processor 201 through the communication line 202. The memory 203 may alternatively be integrated with the processor 201. The memory provided in embodiments of this application may be usually non-volatile. The memory 203 is configured to store computer-executable instructions for performing the solutions provided in embodiments of this application, and the processor 201 controls the execution of the computer-executable instructions. The processor 201 is configured to execute the computer-executable instructions stored in the memory 203, to implement the method provided in embodiments of this application.

The computer-executable instructions in embodiments of this application may also be referred to as application program code. This is not specifically limited in embodiments of this application.

The coupling in embodiments of this application may be an indirect coupling or a communication connection between apparatuses, units, or modules in an electrical form, a mechanical form, or another form, and is used for information exchange between the apparatuses, the units, or the modules.

In an embodiment, the processor 201 may include one or more CPUs, for example, a CPU 0 and a CPU 1 in FIG. 2.

In an embodiment, the communication apparatus 20 may include a plurality of processors, for example, the processor 201 and a processor 207 in FIG. 2. Each of the processors may be a single-core (single-CPU) processor, or may be a multi-core (multi-CPU) processor. The processor herein may be one or more devices, circuits, and/or processing cores configured to process data (for example, computer program instructions).

In an embodiment, the communication apparatus 20 may further include an output device 205 and/or an input device 206. The output device 205 is coupled to the processor 201, and may display information in a plurality of manners. For example, the output device 205 may be a liquid crystal display (liquid crystal display, LCD), a light emitting diode (light emitting diode, LED) display device, a cathode ray tube (cathode ray tube, CRT) display device, or a projector (projector). The input device 206 is coupled to the processor 201, and may receive an input of a user in a plurality of manners. For example, the input device 206 may be a mouse, a keyboard, a touchscreen device, or a sensor device.

The foregoing communication apparatus 20 may be a general-purpose device or a special-purpose device. A type of the communication apparatus 20 is not limited in embodiments of this application.

The following describes in detail a PUCCH transmission method provided in embodiments of this application with reference to FIG. 1 and FIG. 2.

It should be noted that names of messages between network elements, names of parameters in the messages, or the like in the following embodiments of this application are merely examples, and there may be other names during specific implementation. This is not specifically limited in embodiments of this application.

It should be noted that, in embodiments of this application, "/" may represent an "or" relationship between associated objects. For example, A/B may represent A or B. "And/or" may be used to describe three relationships between associated objects. For example, A and/or B may represent the following three cases: Only A exists, both A and B exist, and only B exists. A and B may be singular or plural.

To facilitate description of the technical solutions in embodiments of this application, in embodiments of this application, terms such as "first" and "second" may be used to distinguish between technical features having same or similar functions. The terms such as "first" and "second" do not limit a quantity and an execution sequence, and the terms such as "first" and "second" do not indicate a definite difference. In embodiments of this application, the term such as "example" or "for example" is used to represent an example, an illustration, or a description. Any embodiment or design scheme described with "example" or "for example" should not be explained as being more preferred or having more advantages than another embodiment or design scheme. Use of the term such as "example" or "for example" is intended to present a related concept in a specific manner for ease of understanding.

It should be noted that in embodiments of this application, for a technical feature, "first", "second", "third", "A", "B", "C", and "D" are used to distinguish between technical features in the technical feature, and there is no sequential order or size order between the technical features described by "first", "second", "third", "A", "B", "C", and "D".

It may be understood that a same step or a step or a technical feature having a same function in embodiments of this application may be mutually referenced in different embodiments.

It may be understood that, in embodiments of this application, a network device and/or a terminal may perform some or all of steps in embodiments of this application. The steps are merely examples. In embodiments of this application, other steps or variations of various steps may alternatively be performed. In addition, the steps may be performed in a sequence different from a sequence presented in embodiments of this application, and not all the steps in embodiments of this application need to be performed.

In embodiments of this application, a specific structure of an execution body of the PUCCH transmission method is not particularly limited in embodiments of this application, provided that the method provided in embodiments of this application can be implemented. For example, the PUCCH transmission method provided in embodiments of this application may be performed by a network device, or a component, for example, a chip, used in the network device. This is not limited in this application. Alternatively, the PUCCH transmission method provided in embodiments of this application may be performed by a terminal, or a component, for example, a chip, used in the terminal. This is not limited in this application. In the following embodiments, an example in which the PUCCH transmission method is separately performed by the network device and the terminal is used for description.

It may be understood that in descriptions of a "carrier" as an example in this application, the "carrier" and a "cell" may be mutually replaced. For example, "a plurality of carriers" may be replaced with "a plurality of cells". Details are not described herein.

Figure 3:
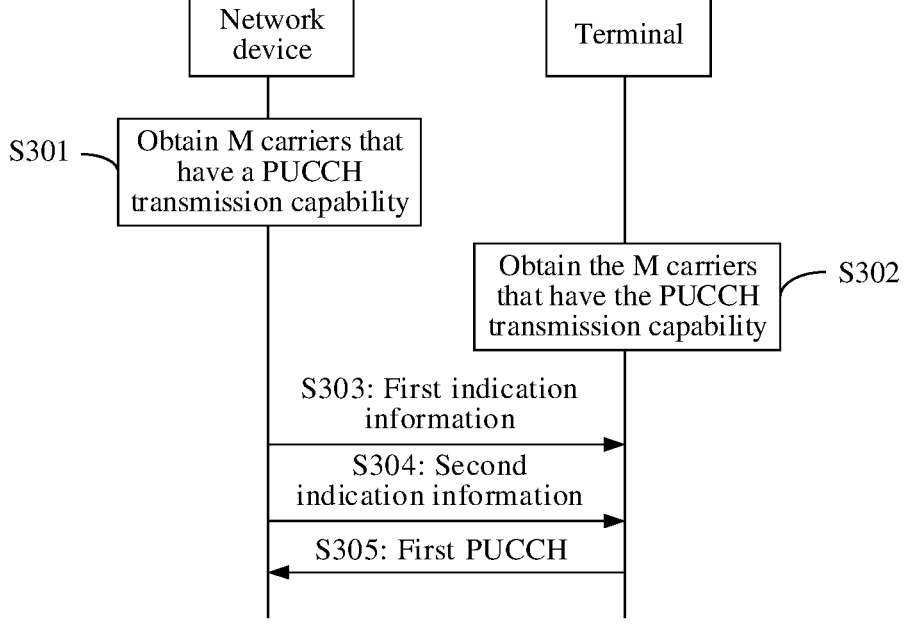
FIG. 3 is a schematic flowchart 1 of a PUCCH transmission method according to an embodiment of this application.

FIG. 3 shows a PUCCH transmission method according to an embodiment of this application. The PUCCH transmission method includes S301 to S305.

S301: A network device obtains M carriers that have a PUCCH transmission capability.

The network device may be the network device in the communication system 10 shown in FIG. 1, for example, the network device 101. The M carriers may be included in a PUCCH group, and M is an integer greater than 1. The M carriers may be in a same frequency band (band), or may be in different frequency bands. A carrier having the PUCCH transmission capability may be understood as that a PUCCH can be transmitted on the carrier.

The PUCCH group may be defined in a protocol, or may be configured by the network device. An example in which the PUCCH group is configured by the network device is used. The network device may configure the PUCCH group for a terminal, and send, to the terminal, indication information indicating the PUCCH group. In this way, after receiving the indication information, the terminal may determine, based on the indication information, specific carriers included in the PUCCH group.

The terminal may be any terminal in the communication system 10 shown in FIG. 1, for example, the terminal 102, the terminal 103, or the terminal 104. The PUCCH group includes N carriers, and N is an integer greater than or equal to M. It should be understood that the network device may alternatively configure a plurality of PUCCH groups for the terminal. In this case, the network device may obtain M carriers from each PUCCH group.

In this embodiment of this application, the PUCCH may carry uplink control information (uplink control information, UCI), for example, HARQ-ACK information. The PUCCH may be referred to as a physical uplink control channel, an uplink control channel, or the like. A naming form of the PUCCH is not specifically limited in this embodiment of this application. A unified description is provided herein, and details are not described later.

It may be understood that the network device may obtain, in a plurality of manners, the M carriers that have the PUCCH transmission capability. The following three manners are used as examples for description below.

Manner 1: The M carriers are activated by the network device.

In a possible implementation, that a network device obtains M carriers that have a PUCCH transmission capability includes: The network device determines all carriers in the PUCCH group as the M carriers. That is, the M carriers are all the carriers in the PUCCH group. In this case, M is equal to N. After determining the M carriers, the network device may send, to the terminal, indication information used to activate the M carriers. The indication information may be included in radio resource control (radio resource control, RRC) signaling or media access control control element (media access control control element, MAC CE) signaling.

In another possible implementation, that a network device obtains M carriers that have a PUCCH transmission capability includes: The network device determines the M carriers from the PUCCH group, where M is less than N. For example, the network device determines the M carriers from the PUCCH group based on at least one of a quantity of terminals that access the network device, a service requirement of a terminal that accesses the network device, or a service requirement of a terminal that sends a PUCCH. After determining the M carriers, the network device may send, to the terminal, indication information used to activate the PUCCH transmission capability of the M carriers. The indication information may be included in MAC CE signaling.

Further, in the foregoing two possible implementations, for each PUCCH group, the indication information used to activate the M carriers and/or the indication information used to activate the PUCCH transmission capability of the M carriers may be used to activate M-1 carriers. The M-1 carriers do not include a preset carrier used for PUCCH transmission in the PUCCH group. After receiving the indication information, the terminal may determine the M-1 carriers and the preset carrier used for PUCCH transmission in the PUCCH group as the M carriers. If a quantity of PUCCH groups is 1, a preset carrier used for PUCCH transmission in the PUCCH group may be a carrier corresponding to a primary cell (primary cell, PCell). If a quantity of PUCCH groups is greater than 1, one PUCCH group is a primary PUCCH group (primary PUCCH group), and a preset carrier used for PUCCH transmission in the group may be a carrier corresponding to a PCell. Another PUCCH group is a secondary PUCCH group (secondary PUCCH group), and a preset carrier used for PUCCH transmission in the group may be a carrier corresponding to a PUCCH secondary cell (PUCCH secondary cell, PUCCH SCell). To be specific, when a PUCCH cell group includes a carrier corresponding to a PCell, the carrier corresponding to the PCell is used for PUCCH transmission; or when a PUCCH cell does not include a carrier corresponding to a PCell, that is, includes only a carrier corresponding to an SCell, a carrier corresponding to one SCell may be preset for PUCCH transmission.

Manner 2: Configuration information for PUCCH transmission is respectively configured for the M carriers.

The configuration information for PUCCH transmission may be configured by the network device. The configuration information for PUCCH transmission may include a PUCCH related configuration, for example, a first set and a PUCCH resource set. The first set may include at least one time interval, and the first set may also be referred to as a set of $K_1$, a set of values of $K_1$, or the like. This is not limited. The PUCCH resource set may include a plurality of PUCCH time-frequency resources. The time interval is a time interval between a moment for transmitting a physical downlink shared channel (physical downlink shared channel, PDSCH) and a moment for transmitting a first PUCCH. The first PUCCH may be used to carry HARQ-ACK information corresponding to the PDSCH, and the HARQ-ACK information may indicate whether the terminal correctly receives a downlink data transport block carried on the PDSCH delivered by the network device. In this embodiment of this application, a unit of the time interval may be a symbol, a sub-slot (sub-slot), a slot (slot), a subframe (subframe), or the like. This is not limited.

In a possible implementation, that a network device obtains M carriers that have a PUCCH transmission capability includes: The network device determines carriers for which configuration information for PUCCH transmission is configured in the PUCCH group as the M carriers. It may be understood that the preset carrier used for PUCCH transmission in the PUCCH group is included in the M carriers. In other words, configuration information for PUCCH transmission is configured for the preset carrier used for PUCCH transmission in the PUCCH group.

It may be understood that, in this embodiment of this application, that the configuration information for PUCCH transmission is configured for the carrier may mean that the carrier has corresponding configuration information for PUCCH transmission. Further, configuration information for PUCCH transmission may be respectively configured for carriers in the M carriers, and the configuration information, used for PUCCH transmission, of the M carriers may be completely the same, may be partially the same, or may be completely different. The M carriers may alternatively share configuration information for PUCCH transmission, that is, the configuration information, used for PUCCH transmission, of the M carriers is the same.

Manner 3: A time unit corresponding to each of the M carriers includes at least R non-downlink symbols at a time domain position of a first PUCCH, where R is a positive integer.

In a possible implementation, the network device determines the time domain position of the first PUCCH, and obtains, based on the time domain position of the first PUCCH, the M carriers that have the PUCCH transmission capability. Further, that the network device obtains, based on the time domain position of the first PUCCH, the M carriers that have the PUCCH transmission capability includes: The network device determines, as the M carriers, carriers with corresponding time units including at least R non-downlink symbols at the time domain position of the first PUCCH in the PUCCH group. In this way, time units corresponding to the M carriers all include the non-downlink symbols at the time domain position of the first PUCCH. Therefore, the M carriers each have the PUCCH transmission capability.

In this embodiment of this application, the time unit includes at least one time domain symbol, for example, an orthogonal frequency division multiplexing (orthogonal frequency division multiplexing, OFDM) symbol. For example, the time unit may be a slot or a sub-slot. The non-downlink symbol may include at least one of an uplink symbol or a flexible symbol.

It may be understood that after obtaining the M carriers in Manner 1 or Manner 2, the network device may alternatively determine the carrier from the M carriers in Manner 3. Subsequently, the network device may indicate a first carrier in the M determined carriers by using first indication information. After receiving the first indication information, the terminal may determine the first carrier based on the first indication information.

S302: The terminal obtains the M carriers that have the PUCCH transmission capability.

It may be understood that the M carriers obtained by the terminal are the same as the M carriers obtained by the network device. Therefore, the terminal may obtain, in a manner corresponding to the network device, the M carriers that have the PUCCH transmission capability. Detailed descriptions are provided below.

For Manner 1, that the terminal obtains the M carriers that have the PUCCH transmission capability includes: The terminal receives, from the network device, the indication information used to activate the M carriers or the indication information used to activate the PUCCH transmission capability of the M carriers, and determines, as the M carriers, the M carriers indicated by the indication information used to activate the M carriers or the indication information used to activate the PUCCH transmission capability of the M carriers. Further, if the indication information used to activate the M carriers or the indication information used to activate the PUCCH transmission capability of the M carriers indicates the M-1 carriers, after receiving the indication information, the terminal determines, as the M carriers, the M-1 carriers and the preset carrier used for PUCCH transmission in the PUCCH group.

For Manner 2, that the terminal obtains the M carriers that have the PUCCH transmission capability includes: The terminal determines the carriers for which the configuration information for PUCCH transmission is configured in the PUCCH group as the M carriers.

For Manner 3, the network device may send second indication information to the terminal device, where the second indication information indicates the time domain position of the first PUCCH. Correspondingly, after receiving the second indication information, the terminal obtains, based on the second indication information, the M carriers that have the PUCCH transmission capability, that is, the terminal performs the operation of S302. For details about a step in which the network device sends the second indication information, refer to the following descriptions of step S304. In other words, in this implementation, S304 is performed before S302.

In a possible implementation, the second indication information includes first position information and time interval information. The first position information indicates a time domain position of a PDSCH. The time interval information indicates a time interval between a moment for transmitting the PDSCH and a moment for transmitting the first PUCCH. For example, the time interval information includes an index of the time interval in the first set. Further, the second indication information may further include a start position of the first PUCCH in a time unit and a quantity of symbols occupied by the first PUCCH.

In another possible implementation, the second indication information includes a start position of the first PUCCH in time domain and a quantity of symbols occupied by the first PUCCH.

Further, that the terminal obtains, based on the second indication information, the M carriers that have the PUCCH transmission capability includes: The terminal determines, as the M carriers, carriers with corresponding time units including at least R non-downlink symbols at the time domain position indicated by the second indication information in the PUCCH group.

S303: The network device sends the first indication information to the terminal.

The first indication information indicates the first carrier, and the first carrier is included in the M carriers. The first carrier is a carrier that is finally used to transmit the first PUCCH.

There may be the following two cases for the first indication information:

Case 1: There is an association relationship between a quantity of bits occupied by the first indication information and M.

In a possible implementation, that there is an association relationship between a quantity of bits occupied by the first indication information and M includes: The quantity P of bits occupied by the first indication information satisfies a formula: $P=\lceil \log_2 M \rceil$. Further, the first indication information includes an index of the first carrier in the M carriers. In this way, the network device may indicate, by using the P bits, that any one of the M carriers is the first carrier.

For example, if M is 3, P is 2, to be specific, the first indication information occupies two bits. If a value of the two bits is "00", the first indication information indicates that the $1^{st}$ carrier in the M carriers is the first carrier. If a value of the two bits is "01", the first indication information indicates that the $2^{nd}$ carrier in the M carriers is the first carrier. If a value of the two bits is "10", the first indication information indicates that the $3^{rd}$ carrier in the M carriers is the first carrier.

Case 2: The quantity of bits occupied by the first indication information is determined by the network device. In other words, the network device may configure the quantity of bits occupied by the first indication information. In this case, a quantity Q of carriers that can be indicated by the first indication information may be greater than M, equal to M, or less than M. Q may satisfy a formula: $Q=2^P$.

If Q is greater than M, the first indication information may indicate that any one of the M carriers is the first carrier. In the first indication information, a remaining bit other than a bit indicating the first carrier may be used for another purpose. This is not limited.

If Q is equal to M, the first indication information may indicate that any one of the M carriers is the first carrier, and no bit remains after the first indication information indicates the first carrier.

If Q is less than M, the first indication information may indicate that some carriers (Q carriers) in the M carriers are first carriers. In this case, the network device may determine at least one second carrier from the M carriers. The first carrier is included in at least one second carrier. In a possible implementation, a time unit corresponding to the at least one second carrier includes at least R non-downlink symbols at the time domain position indicated by the second indication information.

If the quantity of the at least one second carrier is less than or equal to Q, the first indication information may indicate that any one of the at least one second carrier is the first carrier. If the quantity of the at least one second carrier is greater than Q, the first indication information may indicate Q carriers in the at least one second carrier. In a possible implementation, the first indication information may indicate the first Q carriers in the at least one second carrier, that is, an index of the first carrier in the at least one second carrier is less than or equal to Q. Carriers in the at least one second carrier may be sorted in descending order or ascending order of carrier identifiers.

For example, if the at least one second carrier includes a carrier 1, a carrier 2, and a carrier 3, and Q is 2, the first indication information may indicate that the carrier 1 or the carrier 2 is the first carrier. For example, the first indication information is of one bit. If a value of the bit is "0", it indicates that the carrier 1 is the first carrier; or if a value of the bit is "1", it indicates that the carrier 2 is the first carrier; and if a value of the bit is "0", it indicates that the carrier 2 is the first carrier; or if a value of the bit is "1", it indicates that the carrier 1 is the first carrier.

In a possible implementation, the first indication information is included in downlink control information (downlink control information, DCI).

In an example, the first indication information may be included in a newly added indicator field in the DCI. In other words, a new indicator field may be added to the DCI, and the indicator field indicates the first carrier.

In another example, the first indication information may be included in an original indicator field in the DCI, and a function of indicating the first carrier may be added to the original indicator field. For example, the first carrier may be indicated by using a PUCCH resource indicator field (PUCCH resource indicator). The PUCCH resource indicator field usually indicates PUCCH resource information, and the PUCCH resource information includes a time domain position, a frequency domain position, code information, and the like of the PUCCH. If the first indication information is included in the PUCCH resource indicator field, carrier index information (for example, an identifier of the first carrier) may be added to the PUCCH resource information, so that the PUCCH resource indication field may indicate the first carrier and the PUCCH resource information.

In an NR system, there are two types of DCI used for data scheduling: first-type DCI and second-type DCI. A type and a size of an indicator field included in the first-type DCI are preset in a protocol or preconfigured by a network side, and the first-type DCI is used to schedule common information, or used to schedule data before higher layer signaling is configured or in an ineffective period of reconfigured higher layer signaling. An advantage is that a length of the DCI and a meaning of each indicator field are fixed, and before the higher layer signaling is configured or in the ineffective period of the reconfigured higher layer signaling, different understandings are not caused between the network device and the terminal device. A type of an indicator field included in the second-type DCI and a size of each indicator field may be configured by using higher layer signaling. An advantage is that the type and the size of the indicator field can be adjusted based on an actual service requirement, so that the indicator field is more suitable for a current service and channel. In the NR system, the first-type DCI may be a DCI format 1_0, and the second-type DCI may be a DCI format 1_1/1_2/3_0, or the like. Therefore, during specific application, the first indication information may be included in the first-type DCI or the second-type DCI. If the first indication information is included in the first-type DCI, the indicator field in the first-type DCI may indicate the first carrier through preconfiguration. If the first indication information is included in the second-type DCI, the indicator field in the second-type DCI may indicate the first carrier through configuration using higher layer signaling.

Correspondingly, the terminal receives the first indication information from the network device.

Further, after receiving the first indication information, the terminal may determine the first carrier based on the first indication information.

For example, Case 1 is used as an example. If M is 3, P is 2, to be specific, the first indication information occupies two bits. If a value of the two bits is "00", the terminal determines the 1st carrier in the M carriers as the first carrier. If a value of the two bits is "01", the terminal determines the $2^{nd}$ carrier in the M carriers as the first carrier. If a value of the two bits is "10", the terminal determines the $3^{rd}$ carrier in the M carriers as the first carrier.

For example, Case 2 is used as an example. When Q is greater than M, if M is 2, the first indication information occupies two bits, and a value of the two bits is "00", the terminal determines the $1^{st}$ carrier in the M carriers as the first carrier. If a value of the two bits is "01", the terminal determines the $2^{nd}$ carrier in the M carriers as the first carrier. The $1^{st}$ bit in the first indication information may be used for another purpose.

For example, Case 2 is used as an example. When Q is equal to M, if M is 4, the first indication information occupies two bits, and a value of the two bits is "00", the terminal determines the $1^{st}$ carrier in the M carriers as the first carrier. If a value of the two bits is "01", the terminal determines the $2^{nd}$ carrier in the M carriers as the first carrier. If a value of the two bits is "10", the terminal determines the $3^{rd}$ carrier in the M carriers as the first carrier. If a value of the two bits is "11", the terminal determines the $4^{th}$ carrier in the M carriers as the first carrier.

For example, Case 2 is used as an example. When Q is less than M, the terminal may determine at least one second carrier from the M carriers. The first carrier is included in at least one second carrier. In a possible implementation, a time unit corresponding to the at least one second carrier includes at least R non-downlink symbols at the time domain position indicated by the second indication information. If the quantity of the at least one second carrier is less than or equal to Q, the terminal may determine the first carrier from the at least one second carrier based on the first indication information. If the quantity of the at least one second carrier is greater than Q, the terminal may sort carriers in the at least one second carrier in descending order or ascending order of carrier identifiers, and determine the first carrier from the at least one second carrier based on the first indication information. In this case, an index of the first carrier in the at least one second carrier is less than or equal to Q.

S304: The network device sends the second indication information to the terminal.

For descriptions of the second indication information, refer to the descriptions in S302. Details are not described herein again.

It may be understood that, when the second indication information includes the first position information and the time interval information, if the terminal has not determined the first carrier, the terminal does not learn of configuration information for PUCCH transmission that is configured for the first carrier, that is, the terminal does not learn of a quantity of time intervals included in the first set. In this case, the terminal cannot determine a quantity of bits occupied by the time interval information, and therefore cannot correctly parse the second indication information to obtain the first position information and the time interval information.

To resolve the foregoing problem, a quantity of time intervals included in each of first sets corresponding to the M carriers may be made the same; or the quantity of bits occupied by the time interval information is determined by a quantity of time intervals included in a second set; and the second set includes a largest quantity of time intervals in first sets corresponding to the M carriers. In this way, the terminal may correctly parse the second indication information, further determine the first position information and the time interval information, and determine the time domain position of the first PUCCH based on the first position information and the time interval information.

In a possible implementation, the second indication information may be included in DCI.

It may be understood that the first indication information and the second indication information may be sent in one piece of information. For example, both the first indication information and the second indication information are included in DCI or RRC signaling. In other words, the first indication information and the second indication information may be located in different fields of the DCI or the RRC signaling.

Correspondingly, the terminal receives the second indication information from the network device.

Further, after receiving the second indication information, the terminal may determine the time domain position of the first PUCCH based on the second indication information.

Figure 4A:
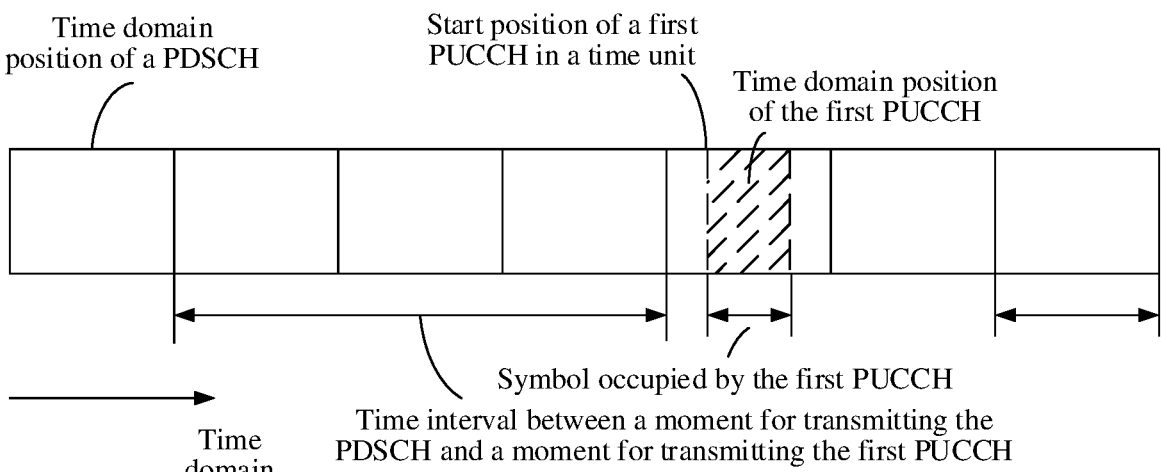
FIG. 4A is a schematic diagram 1 of a time domain position according to an embodiment of this application.

For example, FIG. 4A is a schematic diagram of the time domain position of the first PUCCH when the second indication information includes the first position information and the time interval information. The terminal may add a time unit index corresponding to the time domain position of the PDSCH that is indicated by the first position information and the time interval indicated by the time interval information, to obtain a time unit in which the first PUCCH is located. Further, the second indication information may further include a start position of the first PUCCH in a time unit and a quantity of symbols occupied by the first PUCCH, and the terminal may determine, as the time domain position of the first PUCCH, a corresponding time domain resource that is in the time unit in which the first PUCCH is located, whose start position is the start position of the first PUCCH in the time unit, whose size is a symbol occupied by the first PUCCH.

Figure 4B:
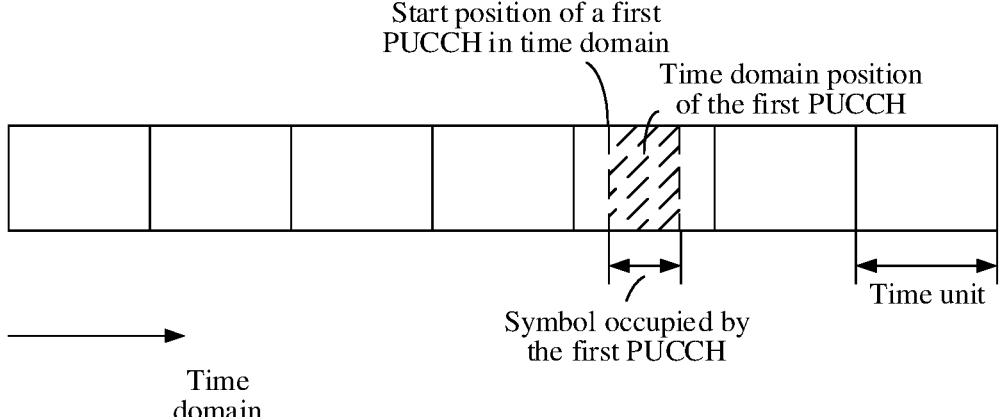
FIG. 4B is a schematic diagram 2 of a time domain position according to an embodiment of this application.

For example, FIG. 4B is a schematic diagram of the time domain position of the first PUCCH when the second indication information includes the start position of the first PUCCH in time domain and the quantity of symbols occupied by the first PUCCH. The terminal may determine, as the time domain position of the first PUCCH, a corresponding time domain resource whose start position is the start position of the first PUCCH in time domain and whose size is a symbol occupied by the first PUCCH.

S305: The terminal sends the first PUCCH to the network device on the first carrier.

The first PUCCH may carry UCI such as the HARQ-ACK information corresponding to the PDSCH.

In a possible implementation, the terminal sends, on the first carrier, the first PUCCH to the network device at the time domain position indicated by the second indication information.

Correspondingly, the network device receives, on the first carrier, the first PUCCH from the terminal.

Further, the network device receives, on the first carrier, the first PUCCH from the terminal at the time domain position indicated by the second indication information.

Based on the method shown in FIG. 3, the terminal may obtain the M carriers that have the PUCCH transmission capability, determine, from the M carriers based on the first indication information, the first carrier used to transmit the first PUCCH, determine the time domain position of the first PUCCH based on the second indication information, and send the first PUCCH to the network device on the first carrier. In this way, the terminal may determine, from the PUCCH group, the M carriers that can be used for PUCCH transmission, and may further determine, according to an indication of the network device, a carrier that is finally used for PUCCH transmission. The M carriers may be determined based on at least one of a quantity of terminals that access the network device, a service requirement of a terminal that accesses the network device, a service requirement of a terminal that sends a PUCCH, or whether a non-downlink symbol exists in a carrier. Therefore, the M carriers are carriers that are more suitable for PUCCH transmission in the PUCCH group. In addition, the M carriers are a subset of carriers in the PUCCH group. Therefore, indication information indicating the carrier (that is, the first carrier) that is finally used for PUCCH transmission may include a small quantity of bits to indicate any one of the M carriers, so that complexity of the network device and the terminal can be reduced, and signaling overheads can be reduced.

The actions of the network device or the terminal in S301 to S305 may be performed by the processor 201 in the communication apparatus 20 shown in FIG. 2 by invoking application program code stored in the memory 203. This is not limited in this embodiment of this application.

Optionally, in a possible implementation of the method shown in FIG. 3, the terminal may send a second PUCCH to the network device. The second PUCCH is used to carry HARQ-ACK information corresponding to a PDSCH different from a PDSCH corresponding to the first PUCCH, but there is no corresponding indication information for indicating a carrier on which the second PUCCH is transmitted. In this case, the terminal may send the second PUCCH to the network device on the first carrier or a preset carrier, or the terminal may determine, according to a preset rule, a carrier used to transmit the second PUCCH. The preset carrier may be a carrier defined in a protocol, or may be a carrier determined by the network device. In an example, the preset carrier may be any carrier in the PUCCH group. For example, the preset carrier is a preset carrier used for PUCCH transmission in the PUCCH group. For descriptions of the preset carrier used for PUCCH transmission in the PUCCH group, refer to the descriptions in Manner 1. For example, the preset carrier used for PUCCH transmission in the PUCCH group may be a carrier corresponding to a PCell or a PUCCH SCell. Optionally, the carrier used to transmit the second PUCCH is included in the M carriers.

Figure 5:
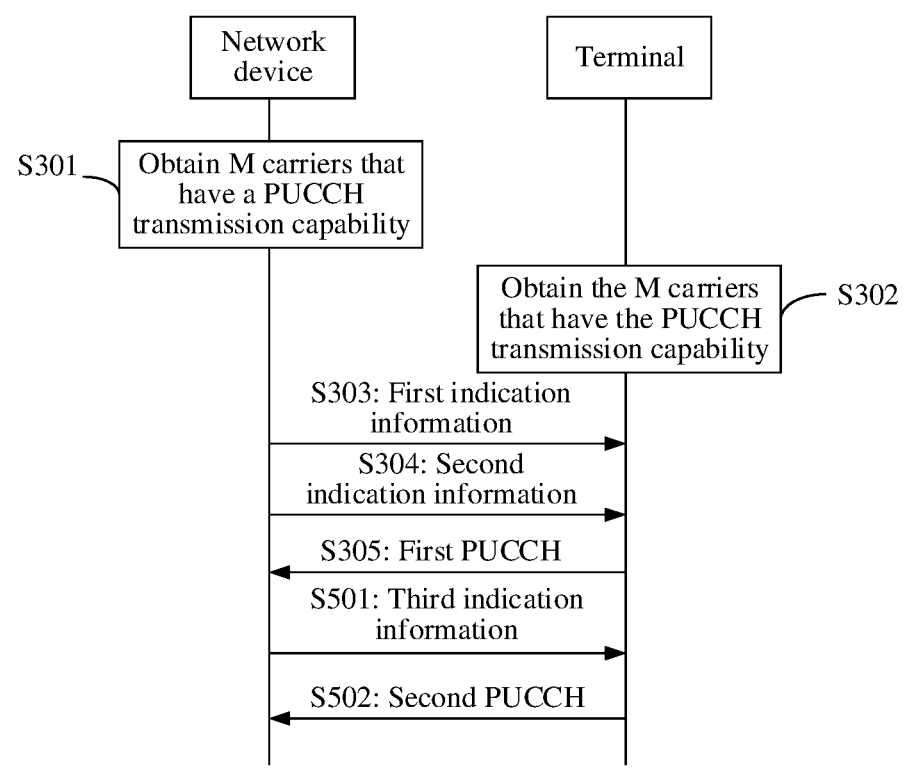
FIG. 5 is a schematic flowchart 2 of a PUCCH transmission method according to an embodiment of this application.

In an example, the network device may send, to the terminal, third indication information indicating a time domain position of the second PUCCH, so that the terminal determines, based on the third indication information, the time domain position of the second PUCCH and the carrier used to transmit the second PUCCH. Specifically, as shown in FIG. 5, the method shown in FIG. 3 may further include S501 and S502.

S501: The network device sends the third indication information to the terminal.

The third indication information may indicate the time domain position of the second PUCCH. For descriptions of the third indication information, refer to the foregoing descriptions of the second indication information. The time domain position indicated by the third indication information and the time domain position indicated by the second indication information may be the same or different.

It may be understood that S501 may be performed before S304, or may be performed after S304.

Correspondingly, the terminal receives the third indication information from the network device.

It may be understood that after receiving the third indication information, the terminal may determine the time domain position of the second PUCCH based on the third indication information.

S502: The terminal sends the second PUCCH to the network device based on the third indication information.

In a possible implementation, if the second PUCCH and the first PUCCH are located in a same time unit, the terminal sends the second PUCCH to the network device on the first carrier or the preset carrier; or the terminal determines, according to the preset rule, the carrier used to transmit the second PUCCH. Alternatively, if the second PUCCH and the first PUCCH are located in different time units, the terminal sends the second PUCCH to the network device on the preset carrier; or the terminal determines, according to the preset rule, the carrier used to transmit the second PUCCH. For details, refer to the following descriptions in Case 3 to Case 13:

Case 3: If the second PUCCH and the first PUCCH are located in the same time unit, and a sending moment of the third indication information is earlier than a sending moment of the second indication information, the terminal sends, on the first carrier, the second PUCCH to the network device at the time domain position indicated by the second indication information.

In Case 3, in this embodiment of this application, S501 is performed before S304. If the second PUCCH and the first PUCCH are located in the same time unit, the terminal determines the time domain positions of the first PUCCH and the second PUCCH based on recently received indication information with an indicated time domain position of a PUCCH being in the same time unit (where in this embodiment of this application, the indication information is the second indication information). In other words, if the second PUCCH and the first PUCCH are located in the same time unit, the terminal sends the first PUCCH and the second PUCCH to the network device at the time domain position indicated by the second indication information. In this case, the terminal may combine and send information carried on the second PUCCH and information carried on the first PUCCH. In other words, the terminal may send, on the first carrier, one PUCCH at the time domain position indicated by the second indication information, where information carried on the PUCCH includes the information carried on the second PUCCH and the information carried on the first PUCCH.

Case 4: If the second PUCCH and the first PUCCH are located in the same time unit, and a sending moment of the third indication information is later than a sending moment of the second indication information, the terminal sends, on a preset carrier, the second PUCCH to the network device at the time domain position indicated by the third indication information.

In Case 4, in this embodiment of this application, S304 is performed before S501. If the second PUCCH and the first PUCCH are located in the same time unit, the terminal determines the time domain positions of the first PUCCH and the second PUCCH based on recently received indication information with an indicated time domain position of a PUCCH being in the same time unit (where in this embodiment of this application, the indication information is the third indication information). In other words, if the second PUCCH and the first PUCCH are located in the same time unit, the terminal sends the first PUCCH and the second PUCCH to the network device at the time domain position indicated by the third indication information. In this case, the terminal may combine and send information carried on the second PUCCH and information carried on the first PUCCH. In other words, the terminal may send, on the preset carrier, one PUCCH at the time domain position indicated by the third indication information, where information carried on the PUCCH includes the information carried on the second PUCCH and the information carried on the first PUCCH.

Case 5: If the second PUCCH and the first PUCCH are located in the same time unit, and a sending moment of the third indication information is later than a sending moment of the second indication information, the terminal determines, according to the preset rule, the carrier used to transmit the second PUCCH, and sends, by using the carrier used to transmit the second PUCCH, the second PUCCH to the network device at the time domain position indicated by the third indication information.

First, a specific process in which the terminal determines, according to the preset rule, the carrier used to transmit the second PUCCH is described.

In an example, the terminal determines, based on a correspondence between a time unit and M carriers, the carrier used to transmit the second PUCCH. The correspondence between a time unit and M carriers may be configured by the network device, or may be preset. An example in which a length of the time unit configured by the network device is 5, and the M carriers are a carrier corresponding to a PCell, a carrier corresponding to an SCell 1, and a carrier corresponding to an SCell 2 (that is, the network device configures a correspondence between five time units and three carriers) is used for description. If the network device configures that carriers corresponding to the $1^{st}$ time unit, the $2^{nd}$ time unit, and the $3^{rd}$ time unit are carriers corresponding to the PCell, a carrier corresponding to the $4^{th}$ time unit is a carrier corresponding to the SCell 1, and a carrier corresponding to the $5^{th}$ time unit is a carrier corresponding to the SCell 2, when the time domain position indicated by the third indication information is in the $1^{st}$ time unit, the $2^{nd}$ time unit, or the $3^{rd}$ time unit, the carrier used to transmit the second PUCCH is the carrier corresponding to the PCell. When the time domain position indicated by the third indication information is in the $4^{th}$ time unit, the carrier used to transmit the second PUCCH is the carrier corresponding to the SCell 1. When the time domain position indicated by the third indication information is in the $5^{th}$ time unit, the carrier used to transmit the second PUCCH is the carrier corresponding to the SCell 2.

It may be understood that, in the foregoing example, for the correspondence between a time unit and M carriers that is configured by the network device, a period of five time units is used. In other words, when the time domain position indicated by the third indication information is in the $6^{th}$ time unit, the $7^{th}$ time unit, or the $8^{th}$ time unit, the carrier used to transmit the second PUCCH is the carrier corresponding to the PCell. When the time domain position indicated by the third indication information is in the $9^{th}$ time unit, the carrier used to transmit the second PUCCH is the carrier corresponding to the SCell 1. When the time domain position indicated by the third indication information is in the $10^{th}$ time unit, the carrier used to transmit the second PUCCH is the carrier corresponding to the SCell 2. The rest is deduced by analogy.

In another example, the terminal sequentially determines, according to a sequence of carriers in the M carriers, whether the M carriers can be used to transmit the second PUCCH. The sequence of the carriers may be preset, or may be configured by the network device. The sequence of the carriers may be a descending (or ascending) order of carrier identifiers. An example in which the M carriers are a carrier 1 corresponding to a PCell, a carrier 2 corresponding to an SCell 1, and a carrier 3 corresponding to an SCell 2 is used for description. In a time unit of the time domain position indicated by the third indication information, the terminal first determines whether the carrier 1 can be used to transmit the second PUCCH, and if determining that the carrier 1 can be used to transmit the second PUCCH, the terminal sends, by using the carrier 1, the second PUCCH at the time domain position indicated by the third indication information. If determining that the carrier 1 cannot be used to transmit the second PUCCH, the terminal determines whether the carrier 2 can be used to transmit the second PUCCH. The rest is deduced by analogy.

It may be understood that in addition to the foregoing example, the terminal may further determine, according to another rule, the carrier used to transmit the second PUCCH. For example, the terminal may determine a carrier with a smallest identifier in the M carriers as the carrier used to transmit the second PUCCH; or the terminal may determine a carrier with a largest identifier in the M carriers as the carrier used to transmit the second PUCCH; or the terminal may determine, as the carrier used to transmit the second PUCCH, a carrier corresponding to a cell with a largest cell identifier in M cells corresponding to the M carriers; or the terminal may determine, as the carrier used to transmit the second PUCCH, a carrier corresponding to a cell with a smallest cell identifier in M cells corresponding to the M carriers.

It may be understood that, in Case 5, the terminal may combine and send information carried on the second PUCCH and information carried on the first PUCCH. In other words, the terminal may send, by using the carrier used to transmit the second PUCCH, one PUCCH at the time domain position indicated by the third indication information, where information carried on the PUCCH includes the information carried on the second PUCCH and the information carried on the first PUCCH.

Case 6: If the second PUCCH and the first PUCCH are located in the same time unit, the terminal determines, according to the preset rule, the carrier used to transmit the second PUCCH, and sends, by using the carrier used to transmit the second PUCCH, the second PUCCH to the network device at a time domain position indicated by indication information with a later sending moment in the third indication information and the second indication information.

Case 7: If the second PUCCH and the first PUCCH are located in the same time unit, the terminal sends, on the preset carrier, the second PUCCH to the network device at a time domain position indicated by indication information with a later sending moment in the third indication information and the second indication information.

Case 8: If the second PUCCH and the first PUCCH are located in the same time unit, the terminal sends, on the first carrier, the second PUCCH to the network device at a time domain position indicated by indication information with a later sending moment in the third indication information and the second indication information.

Case 9: If the second PUCCH and the first PUCCH are located in the same time unit, the terminal sends, on the first carrier, the second PUCCH to the network device at the time domain position indicated by the second indication information.

Case 10: If the second PUCCH and the first PUCCH are located in the same time unit, the terminal sends, on the preset carrier, the second PUCCH to the network device at the time domain position indicated by the third indication information.

Case 11: If the second PUCCH and the first PUCCH are located in the same time unit, the terminal determines, according to the preset rule, the carrier used to transmit the second PUCCH, and sends, by using the carrier used to transmit the second PUCCH, the second PUCCH to the network device at the time domain position indicated by the third indication information.

It may be understood that, in Case 6 to Case 11, the terminal may also combine and send information carried on the second PUCCH and information carried on the first PUCCH. For details, refer to the descriptions in Case 3 to Case 5. Details are not described herein again.

Case 12: If the second PUCCH and the first PUCCH are located in the different time units, or no PUCCH other than the second PUCCH is transmitted in a time unit in which the second PUCCH is located, the terminal sends, on the preset carrier, the second PUCCH to the network device at the time domain position indicated by the third indication information.

Case 13: If the second PUCCH and the first PUCCH are located in the different time units, or no PUCCH other than the second PUCCH is transmitted in a time unit in which the second PUCCH is located, the terminal determines, according to the preset rule, the carrier used to transmit the second PUCCH, and sends, by using the carrier used to transmit the second PUCCH, the second PUCCH to the network device at the time domain position indicated by the third indication information.

In Case 6 to Case 13, for a specific process in which the terminal determines, according to the preset rule, the carrier used to transmit the second PUCCH, refer to the descriptions in Case 5. Details are not described herein again.

Correspondingly, the network device receives the second PUCCH from the terminal based on the third indication information.

It may be understood that, in Case 12 and Case 13, the method shown in FIG. 5 may be implemented as an independent embodiment. In other words, this embodiment of this application may provide a PUCCH transmission method, and the method includes S501 and S502.

Based on the method shown in FIG. 5, the terminal may receive, from the network device, the third indication information indicating the time domain position of the second PUCCH, and determine, according to the preset rule, the carrier used to transmit the second PUCCH. In this way, the network device does not need to indicate the carrier used to transmit the second PUCCH. This reduces signaling overheads.

The actions of the network device or the terminal in S501 and S502 may be performed by the processor 201 in the communication apparatus 20 shown in FIG. 2 by invoking application program code stored in the memory 203. This is not limited in this embodiment of this application.

Optionally, in a possible implementation of the method shown in FIG. 5, the network device may indicate, to the terminal, the carrier used to transmit the second PUCCH. For example, the network device sends fourth indication information to the terminal, where the fourth indication information indicates the carrier used to transmit the second PUCCH. The fourth indication information may be included in the first-type DCI or the second-type DCI. In other words, the fourth indication information may be included in an original indicator field in the DCI, and a function of indicating the carrier used to transmit the second PUCCH may be added to the original indicator field.

It may be understood that, if the second PUCCH and the first PUCCH are located in the same time unit, the terminal may combine and send the information carried on the second PUCCH and the information carried on the first PUCCH. For example, the terminal may send, on the first carrier, one PUCCH at the time domain position indicated by the second indication information, where information carried on the PUCCH includes the information carried on the second PUCCH and the information carried on the first PUCCH. Alternatively, the terminal may send, by using the carrier indicated by the fourth indication information, one PUCCH at the time domain position indicated by the third indication information, where information carried on the PUCCH includes the information carried on the second PUCCH and the information carried on the first PUCCH. If the second PUCCH and the first PUCCH are located the different time units, the terminal may separately send the first PUCCH and the second PUCCH. To be specific, the terminal sends, on the first carrier, the first PUCCH at the time domain position indicated by the second indication information, and sends, by using the carrier indicated by the fourth indication information, the second PUCCH at the time domain position indicated by the third indication information.

Figure 6A:
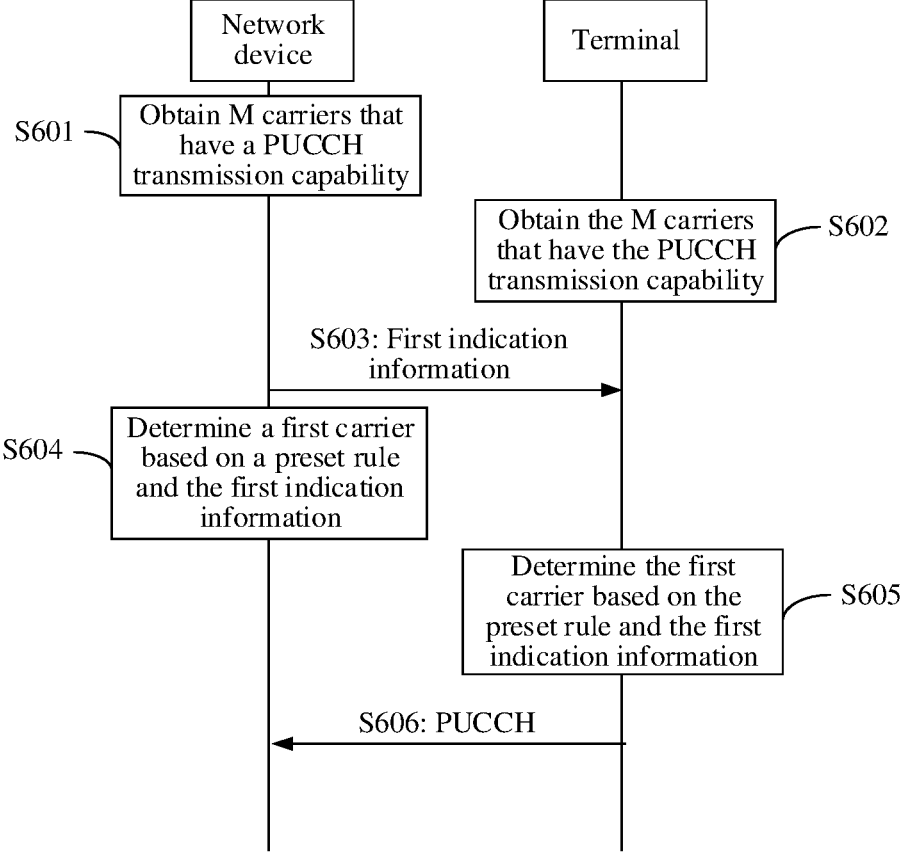
FIG. 6A is a schematic flowchart 3 of a PUCCH transmission method according to an embodiment of this application.

In the methods shown in FIG. 3 and FIG. 5, the network device may indicate, to the terminal by using the first indication information, the carrier used to transmit the PUCCH. During specific application, the network device may not indicate, to the terminal, the carrier used to transmit the PUCCH, and the network device and the terminal may determine, by using a same rule, the carrier used to transmit the PUCCH. Specifically, FIG. 6A shows another PUCCH transmission method according to an embodiment of this application. The method includes S601 to S606.

S601: A network device obtains M carriers that have a PUCCH transmission capability.

S602: The terminal obtains the M carriers that have the PUCCH transmission capability.

For specific descriptions of S601 and S602, refer to corresponding descriptions in S301 and S302. Details are not described again.

S603: The network device sends first indication information to the terminal.

The first indication information indicates a time domain position of a PUCCH. For descriptions of the first indication information, refer to the descriptions of the second indication information in the method shown in FIG. 3.

Correspondingly, the terminal receives the first indication information from the network device.

S604: The network device determines a first carrier based on a preset rule and the first indication information.

The first carrier is included in the M carriers. The first carrier may be used to transmit the PUCCH.

There are a plurality of manners in which the network device determines the first carrier based on the preset rule and the first indication information. The following uses the following two manners as examples for description.

Manner 4: The network device determines a carrier with a smallest identifier in a first set as the first carrier.

A time unit corresponding to a carrier included in the first set includes at least R non-downlink symbols at the time domain position indicated by the first indication information, and the carrier included in the first set includes a non-downlink symbol at the time domain position indicated by the first indication information. For descriptions of the time unit and the non-downlink symbol, refer to the descriptions in the method shown in FIG. 3.

For example, a PUCCH group includes a carrier 1 to a carrier 4, one time unit in each carrier includes 14 symbols, time domain positions indicated by first indication information are the $5^{th}$ symbol to the $7^{th}$ symbol in the $2^{nd}$ time unit, and R is 3. If the $2^{nd}$ time unit in the carrier 1 includes four non-downlink symbols, namely, the $6^{th}$ symbol to the $9^{th}$ symbol, the carrier 1 is not a carrier in the first set. If the $2^{nd}$ time unit in the carrier 2 includes two non-downlink symbols, namely, the $5^{th}$ symbol and the $6^{th}$ symbol, the carrier 2 is not a carrier in the first set. If the $2^{nd}$ time unit in the carrier 3 includes five non-downlink symbols, namely, the $4^{th}$ symbol to the $8^{th}$ symbol, the carrier 3 is a carrier in the first set. If the $2^{nd}$ time unit in the carrier 4 includes three non-downlink symbols, namely, the $5^{th}$ symbol to the $7^{th}$ symbol, the carrier 4 is a carrier in the first set. For the carrier 3 and the carrier 4 in the first set, because an identifier of the carrier 3 is less than that of the carrier 4, the network device may determine the carrier 3 as the first carrier.

Manner 5: The network device sequentially determines each carrier in a second set as the first carrier. In other words, the network device arranges carriers in the second set in a specific order, and determines each carrier as the first carrier in turn.

The carrier included in the second set includes a non-downlink symbol at the time domain position indicated by the first indication information.

For example, the second carrier set includes a carrier 1 to a carrier 3. The network device determines the carrier 1 as the first carrier in the 1st time unit for transmitting the PUCCH; the network device determines the carrier 2 as the first carrier in the $2^{nd}$ time unit for transmitting the PUCCH; the network device determines the carrier 3 as the first carrier in the $3^{rd}$ time unit for transmitting the PUCCH; the network device determines the carrier 1 as the first carrier in the $4^{th}$ time unit for transmitting the PUCCH; the network device determines the carrier 2 as the first carrier in the $5^{th}$ time unit for transmitting the PUCCH; the network device determines the carrier 3 as the first carrier in the $6^{th}$ time unit for transmitting the PUCCH; and so on. The plurality of time units for transmitting the PUCCH are determined according to a time sequence, and the $1^{st}$ time unit for transmitting the PUCCH is a time unit for transmitting the PUCCH for the first time or initially.

Manner 6: The network device determines, as the first carrier based on a correspondence between a time unit and a carrier, a carrier corresponding to the time domain position indicated by the first indication information.

The correspondence between a time unit and a carrier may be predefined or configured by the network device.

For example, the correspondence between a time unit and a carrier is shown in Table 1. A time unit 1 to a time unit 5 in Table 1 are consecutive time units in time domain. If the time domain position indicated by the first indication information is in the time unit 1, the network device determines the carrier 1 as the first carrier. If the time domain position indicated by the first indication information is in the time unit 2, the network device determines the carrier 2 as the first carrier. If the time domain position indicated by the first indication information is in the time unit 3, the network device determines the carrier 3 as the first carrier. If the time domain position indicated by the first indication information is in the time unit 4, the network device determines the carrier 2 as the first carrier. If the time domain position indicated by the first indication information is in the time unit 5, the network device determines the carrier 1 as the first carrier.

TABLE 1

| Time unit | Carrier |
|---|---|
| Time unit 1 | Carrier 1 |
| Time unit 2 | Carrier 2 |
| Time unit 3 | Carrier 3 |
| Time unit 4 | Carrier 2 |
| Time unit 5 | Carrier 1 |
| . . . | . . . |

It may be understood that the correspondence between a time unit and a carrier shown in Table 1 is merely an example. During specific application, the correspondence between a time unit and a carrier may alternatively be in another form. This is not limited.

S605: The terminal determines the first carrier based on the preset rule and the first indication information.

It may be understood that a process in which the terminal determines the first carrier based on the preset rule and the first indication information is similar to a process in which the network device determines the first carrier. Therefore, for details, refer to corresponding descriptions in S604.

An execution sequence of S604 and S605 is not limited in this embodiment of this application. In other words, in this embodiment of this application, S604 may be performed before S605, or S605 may be performed before S604.

S606: The terminal sends, on the first carrier, the PUCCH to the network device at the time domain position of the PUCCH.

The PUCCH may carry HARQ-ACK information and the like corresponding to a PDSCH. The HARQ-ACK information may indicate whether the terminal correctly receives a downlink data transport block carried on the PDSCH delivered by the network device.

Correspondingly, the network device receives, on the first carrier, the PUCCH from the terminal at the time domain position of the PUCCH.

Based on the method shown in FIG. 6A, the network device may not indicate, to the terminal, the carrier used to transmit the PUCCH, and the network device and the terminal may determine, by using a same rule, the carrier used to transmit the PUCCH, to reduce signaling overheads.

The actions of the network device or the terminal in S601 and S602 may be performed by the processor 201 in the communication apparatus 20 shown in FIG. 2 by invoking application program code stored in the memory 203. This is not limited in this embodiment of this application.

Figure 6B:
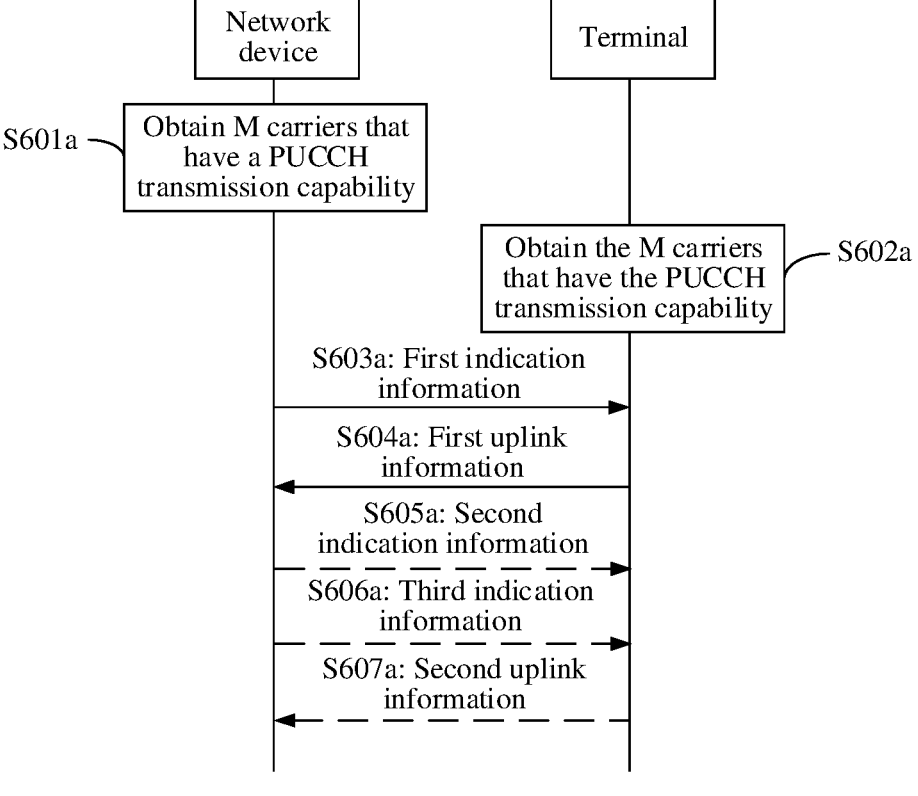
FIG. 6B is a schematic flowchart 4 of a PUCCH transmission method according to an embodiment of this application.

In the methods shown in FIG. 3 and FIG. 5, the network device may indicate, to the terminal by using the first indication information, the carrier used to transmit the PUCCH. However, in some embodiments, no indication information corresponding to one PUCCH indicates a carrier on which the PUCCH is transmitted. In this case, the network device and the terminal may determine, by using some rules, a carrier used to transmit the PUCCH. Specifically, FIG. 6B shows another PUCCH transmission method according to an embodiment of this application. The method includes S601a to S604a.

S601a: A network device obtains M carriers that have a PUCCH transmission capability.

S602a: The terminal obtains the M carriers that have the PUCCH transmission capability.

For specific descriptions of S601a and S602a, refer to corresponding descriptions in S301 and S302. Details are not described again.

S603a: The network device sends first indication information to the terminal.

The first indication information indicates a time domain position for transmitting first uplink information. The first uplink information may include HARQ-ACK information corresponding to a PDSCH. For descriptions of the first indication information, refer to corresponding descriptions of the third indication information in the methods shown in FIG. 3 and FIG. 5.

Correspondingly, the terminal receives the first indication information from the network device.

S604a: The terminal sends, by using a first carrier, the first uplink information to the network device at a first time domain position.

The first time domain position is determined based on the first indication information. The first carrier is included in the M carriers.

In a possible implementation, the first time domain position is a time domain position indicated by the first indication information or a time domain position indicated by third indication information. The first carrier is a preset carrier, or the first carrier is the same as a second carrier, or the first carrier is determined according to a preset rule. For descriptions of the preset carrier, refer to the descriptions in the method shown in FIG. 5. Details are not described herein again. For descriptions of the third indication information, refer to descriptions in S606a below, and for descriptions of the second carrier, refer to descriptions in S605a below.

Correspondingly, the network device receives, on the first carrier, the first uplink information from the terminal at the first time domain position.

Optionally, the method shown in FIG. 6B further includes S605a to S607a.

S605a: The network device sends second indication information to the terminal.

The second indication information may indicate the second carrier. The second carrier is included in the M carriers. The second carrier is the same as or different from the first carrier. For descriptions of the second indication information, refer to corresponding descriptions of the first indication information in the methods shown in FIG. 3 and FIG. 5.

Correspondingly, the terminal receives the second indication information from the network device.

S606a: The network device sends the third indication information to the terminal.

The third indication information may indicate a time domain position for transmitting second uplink information. The second uplink information may include HARQ-ACK information corresponding to a PDSCH. The PDSCH corresponding to the HARQ-ACK information included in the second uplink information is different from the PDSCH corresponding to the HARQ-ACK information included in the first uplink information. For descriptions of the third indication information, refer to corresponding descriptions of the second indication information in the methods shown in FIG. 3 and FIG. 5.

Correspondingly, the terminal receives the third indication information from the network device.

S607a: The terminal sends the second uplink information to the network device based on one or more of the first indication information, the second indication information, and the third indication information.

It may be understood that, to improve resource utilization, if the time domain position indicated by the first indication information and the time domain position indicated by the third indication information are in a same time unit, the terminal may include the first uplink information and the second uplink information in one PUCCH for sending. When the time domain position indicated by the first indication information and the time domain position indicated by the third indication information are in different time units, the terminal may separately include the first uplink information and the second uplink information in different PUCCHs for sending. Detailed descriptions are provided below.

In a possible implementation, if the time domain position indicated by the first indication information and the time domain position indicated by the third indication information are in the same time unit, and a sending moment of the third indication information is later than a sending moment of the first indication information, the first time domain position is the time domain position indicated by the third indication information, and the first carrier is the same as the second carrier. The terminal sends, on the second carrier, the second uplink information to the network device at the time domain position indicated by the third indication information. The first uplink information and the second uplink information are carried on a same PUCCH. For specific descriptions of this process, refer to the descriptions in Case 3. The first PUCCH in Case 3 may be replaced with the second uplink information, and the second PUCCH in Case 3 may be replaced with the first uplink information.

In a possible implementation, if the time domain position indicated by the first indication information and the time domain position indicated by the third indication information are in the same time unit, and a sending moment of the third indication information is earlier than a sending moment of the first indication information, the first time domain position is a time domain position indicated by the first indication information, and the first carrier is the preset carrier, or the first carrier is determined according to the preset rule. The terminal sends, on the first carrier, the second uplink information to the network device at the time domain position indicated by the first indication information. The first uplink information and the second uplink information are carried on a same PUCCH. For specific descriptions of this process, refer to the descriptions in Case 4 and Case 5. The first PUCCH in Case 4 and Case 5 may be replaced with the second uplink information, and the second PUCCH in Case 4 and Case 5 may be replaced with the first uplink information. It should be understood that the preset rule in S607a is the same as the preset rule in Case 5. A unified description is provided herein, and details are not described herein again.

In a possible implementation, if the time domain position indicated by the first indication information and the time domain position indicated by the third indication information are in the same time unit, the first time domain position is a time domain position indicated by indication information with a later sending moment in the first indication information and the third indication information, and the first carrier is the preset carrier, or the first carrier is determined according to the preset rule. The terminal sends, on the first carrier, the second uplink information to the network device at the time domain position indicated by the indication information with the later sending moment in the first indication information and the third indication information. The first uplink information and the second uplink information are carried on a same PUCCH. For specific descriptions of this process, refer to the descriptions in Case 6 and Case 7. The first PUCCH in Case 6 and Case 7 may be replaced with the second uplink information, and the second PUCCH in Case 6 and Case 7 may be replaced with the first uplink information.

In a possible implementation, if the time domain position indicated by the first indication information and the time domain position indicated by the third indication information are in the same time unit, the first time domain position is a time domain position indicated by indication information with a later sending moment in the first indication information and the third indication information, and the first carrier and the second carrier are the same. The terminal sends, on the second carrier, the second uplink information to the network device at the time domain position indicated by indication information with the later sending moment in the first indication information and the third indication information. The first uplink information and the second uplink information are carried on a same PUCCH. For specific descriptions of this process, refer to the descriptions in Case 8. The first PUCCH in Case 8 may be replaced with the second uplink information, and the second PUCCH in Case 8 may be replaced with the first uplink information.

In a possible implementation, if the time domain position indicated by the first indication information and the time domain position indicated by the third indication information are in the same time unit, the first time domain position is the time domain position indicated by the third indication information, and the first carrier is the same as the second carrier. The terminal sends, on the second carrier, the second uplink information to the network device at the time domain position indicated by the third indication information. The first uplink information and the second uplink information are carried on a same PUCCH. For specific descriptions of this process, refer to the descriptions in Case 9. The first PUCCH in Case 9 may be replaced with the second uplink information, and the second PUCCH in Case 9 may be replaced with the first uplink information.

In a possible implementation, if the time domain position indicated by the first indication information and the time domain position indicated by the third indication information are in the same time unit, the first time domain position is the time domain position indicated by the first indication information, and the first carrier is the preset carrier, or the first carrier is determined according to the preset rule. The terminal sends, on the first carrier, the second uplink information to the network device at the time domain position indicated by the first indication information. The first uplink information and the second uplink information are carried on a same PUCCH. For specific descriptions of this process, refer to the descriptions in Case 10 and Case 11. The first PUCCH in Case 10 and Case 11 may be replaced with the second uplink information, and the second PUCCH in Case 10 and Case 11 may be replaced with the first uplink information.

In a possible implementation, if the time domain position indicated by the first indication information and the time domain position indicated by the third indication information are in the different time units, the first time domain position is the time domain position indicated by the first indication information, and the first carrier is the preset carrier, or the first carrier is determined according to the preset rule. The terminal sends, on the second carrier, the second uplink information to the network device at the time domain position indicated by the third indication information. For specific descriptions of this process, refer to the descriptions in Case 12 and Case 13. The first PUCCH in Case 12 and Case 13 may be replaced with the second uplink information, and the second PUCCH in Case 12 and Case 13 may be replaced with the first uplink information.

Correspondingly, the network device receives the second uplink information from the terminal based on one or more of the first indication information, the second indication information, and the third indication information.

The foregoing mainly describes the solutions provided in embodiments of this application from a perspective of interaction between network elements. It may be understood that to implement the foregoing functions, the foregoing network device or terminal includes corresponding hardware structures and/or software modules for implementing the functions. A person skilled in the art should be easily aware that, in combination with units and algorithm operations of the examples described in the embodiments disclosed in this specification, this application can be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In embodiments of this application, functional modules of the network device or the terminal may be divided based on the foregoing method example. For example, the function modules may be divided based on corresponding functions, or two or more functions may be integrated into one processing module. The integrated module may be implemented in a form of hardware, or may be implemented in a form of a software functional module. It should be noted that, in embodiments of this application, module division is an example, and is merely a logical function division. During actual implementation, another division manner may be used.

Figure 7:
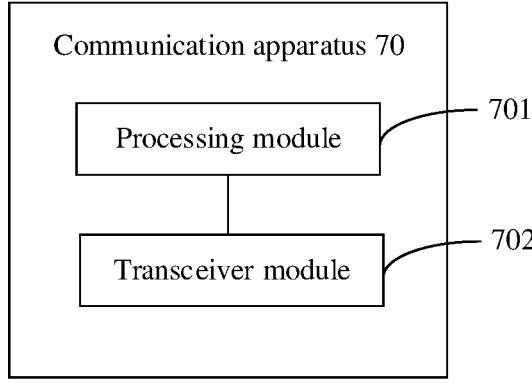
FIG. 7 is a schematic diagram of a structure of a communication apparatus according to an embodiment of this application.

For example, when each functional module is obtained through division in an integrated manner, FIG. 7 is a schematic diagram of a structure of a communication apparatus 70. The communication apparatus 70 includes a processing module 701 and a transceiver module 702.

For example, the communication apparatus 70 is configured to implement a function of the terminal. The communication apparatus 70 is, for example, the terminal described in the embodiment shown in FIG. 3 or the embodiment shown in FIG. 5.

In this embodiment of this application, the communication apparatus 70 may be the terminal, or may be a chip used in the terminal, or another combined device or component that has the function of the terminal. When the communication apparatus 70 is the terminal, the processing module 701 may be a processor (or a processing circuit), for example, a baseband processor, where the baseband processor may include one or more CPUs; and the transceiver module 702 may be a transceiver, where the transceiver may include an antenna, a radio frequency circuit, and the like. When the communication apparatus 70 is a part that has the function of the terminal, the processing module 701 may be a processor (or a processing circuit), for example, a baseband processor; and the transceiver module 702 may be a radio frequency unit. When the communication apparatus 70 is a chip system, the processing module 701 may be a processor (or a processing circuit) of the chip system, and may include one or more central processing units; and the transceiver module 702 may be an input/output interface of a chip (for example, a baseband chip). It should be understood that the processing module 701 in this embodiment of this application may be implemented by a processor or a processor-related circuit component (also referred to as a processing circuit), and the transceiver module 702 may be implemented by a transceiver or a transceiver-related circuit component.

For example, the processing module 701 may be configured to perform all operations, except receiving and sending operations, performed by the terminal in the embodiment shown in FIG. 3, for example, S302, and/or configured to support another process of the technology described in this specification. The transceiver module 702 may be configured to perform all the receiving and sending operations performed by the terminal in the embodiment shown in FIG. 3, for example, S303, S304, and S305, and/or configured to support another process of the technology described in this specification.

For another example, the processing module 701 may be configured to perform all operations, except receiving and sending operations, performed by the terminal in the embodiment shown in FIG. 5, for example, S302, and/or configured to support another process of the technology described in this specification. The transceiver module 702 may be configured to perform all the receiving and sending operations performed by the terminal in the embodiment shown in FIG. 5, for example, S303 to S305 and S501 and S502, and/or configured to support another process of the technology described in this specification.

The processing module 701 is configured to obtain M carriers that have a PUCCH transmission capability, where the M carriers are included in a PUCCH group, and M is an integer greater than 1.

The transceiver module 702 is configured to receive first indication information from a network device, where the first indication information indicates a first carrier, and the first carrier is included in the M carriers.

The transceiver module 702 is further configured to receive second indication information from the network device, where the second indication information indicates a time domain position of a first PUCCH.

The transceiver module 702 is further configured to send the first PUCCH to the network device on the first carrier.

In a possible implementation, there is an association relationship between a quantity of bits occupied by the first indication information and M; or a quantity of bits occupied by the first indication information is determined by the network device.

In a possible implementation, a quantity Q of carriers that can be indicated by the first indication information is less than M, and the processing module 701 is further configured to determine at least one second carrier from the M carriers, where a time unit corresponding to the at least one second carrier includes at least R non-downlink symbols at the time domain position indicated by the second indication information, and the first carrier is included in the at least one second carrier.

In a possible implementation, a quantity of the at least one second carrier is greater than Q, and an index of the first carrier in the at least one second carrier is less than or equal to Q.

In a possible implementation, the transceiver module 702 is further configured to receive third indication information from the network device, where the third indication information indicates a time domain position of a second PUCCH; and the processing module 701 is further configured to send the second PUCCH to the network device based on the third indication information.

In a possible implementation, if the second PUCCH and the first PUCCH are located in a same time unit, and a sending moment of the third indication information is earlier than a sending moment of the second indication information, the transceiver module 702 is specifically configured to send, on the first carrier, the second PUCCH to the network device at the time domain position indicated by the second indication information; or if the second PUCCH and the first PUCCH are located in a same time unit, and a sending moment of the third indication information is later than a sending moment of the second indication information, the transceiver module 702 is specifically configured to send, on a preset carrier, the second PUCCH to the network device at the time domain position indicated by the third indication information; or if the second PUCCH and the first PUCCH are located in different time units, the transceiver module 702 is specifically configured to send, on a preset carrier, the second PUCCH to the network device at the time domain position indicated by the third indication information.

In a possible implementation, that there is an association relationship between a quantity of bits occupied by the first indication information and M includes: The quantity P of bits occupied by the first indication information satisfies a formula: $P=\lceil \log_2 M \rceil$.

In a possible implementation, the M carriers are activated by the network device; or configuration information for PUCCH transmission is respectively configured for the M carriers; or a time unit corresponding to each of the M carriers includes at least R non-downlink symbols at the time domain position of the first PUCCH, where R is a positive integer.

In a possible implementation, the second indication information includes first position information and time interval information, the first position information indicates a time domain position for transmitting a physical downlink shared channel PDSCH, and the time interval information indicates a time interval between a moment for transmitting the PDSCH and a moment for transmitting the first PUCCH.

In a possible implementation, the configuration information for PUCCH transmission includes a first set, and the first set includes at least one time interval; and a quantity of time intervals included in each of first sets corresponding to the M carriers is the same; or a quantity of bits occupied by the time interval information is determined by a quantity of time intervals included in a second set, and the second set includes a largest quantity of time intervals in first sets corresponding to the M carriers.

When the communication apparatus 70 is configured to implement the function of the terminal, for other functions that can be implemented by the communication apparatus 70, refer to related descriptions of the embodiment shown in FIG. 3 or the embodiment shown in FIG. 5. Details are not described again.

Alternatively, for example, the communication apparatus 70 is configured to implement a function of the network device. The communication apparatus 70 is, for example, the network device described in the embodiment shown in FIG. 3 or the embodiment shown in FIG. 5.

In this embodiment of this application, the communication apparatus 70 may be the network device, or may be a chip used in the network device, or another combined device or component that has the function of the network device. When the communication apparatus 70 is the network device, the processing module 701 may be a processor (or a processing circuit), for example, a baseband processor, where the baseband processor may include one or more CPUs; and the transceiver module 702 may be a transceiver, where the transceiver may include an antenna, a radio frequency circuit, and the like. When the communication apparatus 70 is a part that has the function of the network device, the processing module 701 may be a processor (or a processing circuit), for example, a baseband processor; and the transceiver module 702 may be a radio frequency unit. When the communication apparatus 70 is a chip system, the processing module 701 may be a processor (or a processing circuit) of the chip system, and may include one or more central processing units; and the transceiver module 702 may be an input/output interface of a chip (for example, a baseband chip). It should be understood that the processing module 701 in this embodiment of this application may be implemented by a processor or a processor-related circuit component (also referred to as a processing circuit), and the transceiver module 702 may be implemented by a transceiver or a transceiver-related circuit component.

For example, the processing module 701 may be configured to perform all operations, except receiving and sending operations, performed by the network device in the embodiment shown in FIG. 3, for example, S301, and/or configured to support another process of the technology described in this specification. The transceiver module 702 may be configured to perform all the receiving and sending operations performed by the network device in the embodiment shown in FIG. 3, for example, S303 to S305, and/or configured to support another process of the technology described in this specification.

For another example, the processing module 701 may be configured to perform all operations, except receiving and sending operations, performed by the network device in the embodiment shown in FIG. 5, for example, S301, and/or configured to support another process of the technology described in this specification. Alternatively, the processing module 701 may be configured to perform all operations, except receiving and sending operations, performed by the network device in the embodiment shown in FIG. 5, for example, S303 to S305 and S501 and S502, and/or configured to support another process of the technology described in this specification.

The processing module 701 is specifically configured to obtain M carriers that have a PUCCH transmission capability, where the M carriers are included in a PUCCH group, and M is an integer greater than 1.

The transceiver module 702 is configured to send first indication information to a terminal, where the first indication information indicates a first carrier, and the first carrier is included in the M carriers.

The transceiver module 702 is further configured to send second indication information to the terminal, where the second indication information indicates a time domain position of a first PUCCH.

The transceiver module 702 is further configured to receive the first PUCCH from the terminal on the first carrier.

In a possible implementation, there is an association relationship between a quantity of bits occupied by the first indication information and M; or a quantity of bits occupied by the first indication information is determined by the communication apparatus 70.

In a possible implementation, a quantity Q of carriers that can be indicated by the first indication information is less than M, and the processing module 701 is further configured to determine at least one second carrier from the M carriers, where a time unit corresponding to the at least one second carrier includes at least R non-downlink symbols at the time domain position indicated by the second indication information, and the first carrier is included in the at least one second carrier.

In a possible implementation, the transceiver module 702 is further configured to send third indication information to the terminal, where the third indication information indicates a time domain position of a second PUCCH; and the transceiver module 702 is further configured to receive the second PUCCH from the terminal based on the third indication information.

In a possible implementation, if the second PUCCH and the first PUCCH are located in a same time unit, and a sending moment of the third indication information is earlier than a sending moment of the second indication information, the transceiver module 702 is specifically configured to receive, on the first carrier, the second PUCCH from the terminal at the time domain position of the first PUCCH; or if the second PUCCH and the first PUCCH are located in a same time unit, and a sending moment of the third indication information is later than a sending moment of the second indication information, the transceiver module 702 is specifically configured to receive, on a preset carrier, the second PUCCH from the terminal at the time domain position of the second PUCCH; or if the second PUCCH and the first PUCCH are located in different time units, the transceiver module 702 is specifically configured to receive, on a preset carrier, the second PUCCH from the terminal at the time domain position of the second PUCCH.

In a possible implementation, a quantity of the at least one second carrier is greater than Q, and an index of the first carrier in the at least one second carrier is less than or equal to Q.

In a possible implementation, that there is an association relationship between a quantity of bits occupied by the first indication information and M includes: The quantity P of bits occupied by the first indication information satisfies a formula: $P = \lceil \log_2 M \rceil$.

In a possible implementation, the M carriers are activated by the network device; or configuration information for PUCCH transmission is respectively configured for the M carriers; or a time unit corresponding to each of the M carriers includes at least R non-downlink symbols at the time domain position of the first PUCCH, where R is a positive integer.

In a possible implementation, the second indication information includes first position information and time interval information, the first position information indicates a time domain position for transmitting a physical downlink shared channel PDSCH, and the time interval information indicates a time interval between a moment for transmitting the PDSCH and a moment for transmitting the first PUCCH.

In a possible implementation, the configuration information for PUCCH transmission includes a first set, and the first set includes at least one time interval; and a quantity of time intervals included in each of first sets corresponding to the M carriers is the same; or a quantity of bits occupied by the time interval information is determined by a quantity of time intervals included in a second set, and the second set includes a largest quantity of time intervals in first sets corresponding to the M carriers.

When the communication apparatus 70 is configured to implement the function of the network device, for other functions that can be implemented by the communication apparatus 70, refer to related descriptions of the embodiment shown in FIG. 3 or the embodiment shown in FIG. 5. Details are not described again.

Alternatively, for example, the communication apparatus 70 is configured to implement a function of the terminal. The communication apparatus 70 is, for example, the terminal described in the embodiment shown in FIG. 6A.

For example, the processing module 701 may be configured to perform all operations, except receiving and sending operations, performed by the terminal in the embodiment shown in FIG. 6A, for example, S602 and S605, and/or configured to support another process of the technology described in this specification. The transceiver module 702 may be configured to perform all the receiving and sending operations performed by the terminal in the embodiment shown in FIG. 6A, for example, S603 and S606, and/or configured to support another process of the technology described in this specification.

The processing module 701 is configured to obtain M carriers that have a physical uplink control channel PUCCH transmission capability, where the M carriers are included in a PUCCH group, and M is an integer greater than 1.

The transceiver module 702 is configured to receive first indication information from a network device, where the first indication information indicates a time domain position of a PUCCH.

The processing module 701 is further configured to determine a first carrier based on a preset rule and the first indication information, where the first carrier is included in the M carriers.

The transceiver module 702 is further configured to send, on the first carrier, the PUCCH to the network device at the time domain position of the PUCCH.

In a possible implementation, the processing module 701 is specifically configured to determine a carrier with a smallest identifier in a first set as the first carrier, where a time unit corresponding to a carrier included in the first set includes at least R non-downlink symbols at the time domain position indicated by the first indication information, and the carrier included in the first set includes a non-downlink symbol at the time domain position indicated by the first indication information; or the processing module 701 is specifically configured to sequentially determine each carrier in a second set as the first carrier, where the carrier included in the second set includes a non-downlink symbol at the time domain position indicated by the first indication information; or the processing module 701 is specifically configured to determine, as the first carrier based on a correspondence between a time unit and a carrier, a carrier corresponding to a time unit of the time domain position indicated by the first indication information.

In a possible implementation, the correspondence between a time unit and a carrier is predefined or configured by the network device.

In a possible implementation, the M carriers are activated by the network device; or configuration information for PUCCH transmission is respectively configured for the M carriers; or a time unit corresponding to each of the M carriers includes at least R non-downlink symbols at the indicated time domain position of the PUCCH, where R is a positive integer.

In a possible implementation, the first indication information includes first position information and time interval information, the first position information indicates a time domain position for transmitting a physical downlink shared channel PDSCH, and the time interval information indicates a time interval between a moment for transmitting the PDSCH and a moment for transmitting the first PUCCH.

In a possible implementation, the configuration information for PUCCH transmission includes a first set, and the first set includes at least one time interval; and a quantity of time intervals included in each of first sets corresponding to the M carriers is the same; or a quantity of bits occupied by the time interval information is determined by a quantity of time intervals included in a second set, and the second set includes a largest quantity of time intervals in first sets corresponding to the M carriers.

When the communication apparatus 70 is configured to implement the function of the terminal, for other functions that can be implemented by the communication apparatus 70, refer to related descriptions of the embodiment shown in FIG. 6A. Details are not described again.

Alternatively, for example, the communication apparatus 70 is configured to implement a function of the network device. The communication apparatus 70 is, for example, the network device described in the embodiment shown in FIG. 6A.

For example, the processing module 701 may be configured to perform all operations, except receiving and sending operations, performed by the network device in the embodiment shown in FIG. 6A, for example, S6oi and S604, and/or configured to support another process of the technology described in this specification. The transceiver module 702 may be configured to perform all the receiving and sending operations performed by the network device in the embodiment shown in FIG. 6A, for example, S603 and S606, and/or configured to support another process of the technology described in this specification.

The processing module 701 is configured to obtain M carriers that have a PUCCH transmission capability, where the M carriers are included in a PUCCH group, and M is an integer greater than 1.

The transceiver module 702 is configured to send first indication information to a terminal, where the first indication information indicates a time domain position of a PUCCH.

The processing module 701 is further configured to determine a first carrier based on a preset rule and the first indication information, where the first carrier is included in the M carriers.

The transceiver module 702 is further configured to receive, on the first carrier, the PUCCH from the terminal at the time domain position of the PUCCH.

In a possible implementation, the processing module 701 is specifically configured to determine a carrier with a smallest identifier in a first set as the first carrier, where a time unit corresponding to a carrier included in the first set includes at least R non-downlink symbols at the time domain position indicated by the first indication information, and the carrier included in the first set includes a non-downlink symbol at the time domain position indicated by the first indication information; or the processing module 701 is specifically configured to sequentially determine each carrier in a second set as the first carrier, where the carrier included in the second set includes a non-downlink symbol at the time domain position indicated by the first indication information; or the processing module 701 is specifically configured to determine, as the first carrier based on a correspondence between a time unit and a carrier, a carrier corresponding to the time domain position indicated by the first indication information.

In a possible implementation, the correspondence between a time unit and a carrier is predefined or configured by the network device.

In a possible implementation, the M carriers are activated by the network device; or configuration information for PUCCH transmission is respectively configured for the M carriers; or a time unit corresponding to each of the M carriers includes at least R non-downlink symbols at the indicated time domain position of the PUCCH, where R is a positive integer.

In a possible implementation, the first indication information includes first position information and time interval information, the first position information indicates a time domain position for transmitting a physical downlink shared channel PDSCH, and the time interval information indicates a time interval between a moment for transmitting the PDSCH and a moment for transmitting the first PUCCH.

In a possible implementation, the configuration information for PUCCH transmission includes a first set, and the first set includes at least one time interval; and a quantity of time intervals included in each of first sets corresponding to the M carriers is the same; or a quantity of bits occupied by the time interval information is determined by a quantity of time intervals included in a second set, and the second set includes a largest quantity of time intervals in first sets corresponding to the M carriers.

When the communication apparatus 70 is configured to implement the function of the network device, for other functions that can be implemented by the communication apparatus 70, refer to related descriptions of the embodiment shown in FIG. 6A. Details are not described again.

Alternatively, for example, the communication apparatus 70 is configured to implement a function of the terminal. The communication apparatus 70 is, for example, the terminal described in the embodiment shown in FIG. 6B.

For example, the processing module 701 may be configured to perform all operations, except receiving and sending operations, performed by the terminal in the embodiment shown in FIG. 6B, for example, S602a, and/or configured to support another process of the technology described in this specification. The transceiver module 702 may be configured to perform all the receiving and sending operations performed by the terminal in the embodiment shown in FIG. 6B, for example, S603a and S604a, and/or configured to support another process of the technology described in this specification.

The processing module 701 is configured to obtain M carriers that have a PUCCH transmission capability, where the M carriers are included in a PUCCH group, and M is an integer greater than 1.

The transceiver module 702 is configured to receive first indication information from a network device, where the first indication information indicates a time domain position for transmitting first uplink information.

The transceiver module 702 is configured to send, by using a first carrier, the first uplink information to the network device at a first time domain position, where the first time domain position is determined based on the first indication information, and the first carrier is included in the M carriers.

When the communication apparatus 70 is configured to implement the function of the terminal, for other functions that can be implemented by the communication apparatus 70, refer to related descriptions of the embodiment shown in FIG. 6B. Details are not described again.

Alternatively, for example, the communication apparatus 70 is configured to implement a function of the network device. The communication apparatus 70 is, for example, the network device described in the embodiment shown in FIG. 6B.

For example, the processing module 701 may be configured to perform all operations, except receiving and sending operations, performed by the network device in the embodiment shown in FIG. 6B, for example, S601*a*, and/or configured to support another process of the technology described in this specification. The transceiver module 702 may be configured to perform all the receiving and sending operations performed by the network device in the embodiment shown in FIG. 6B, for example, S603*a* and S604*a*, and/or configured to support another process of the technology described in this specification.

The processing module 701 is configured to obtain M carriers that have a PUCCH transmission capability, where the M carriers are included in a PUCCH group, and M is an integer greater than 1.

The transceiver module 702 is configured to send first indication information to a terminal, where the first indication information indicates a time domain position for transmitting first uplink information.

The transceiver module 702 is further configured to receive, by using a first carrier, the first uplink information from the terminal at a first time domain position, where the first time domain position is determined based on the first indication information, and the first carrier is included in the M carriers.

When the communication apparatus 70 is configured to implement the function of the network device, for other functions that can be implemented by the communication apparatus 70, refer to related descriptions of the embodiment shown in FIG. 6B. Details are not described again.

In a simple embodiment, a person skilled in the art may figure out that the communication apparatus 70 may be in the form shown in FIG. 2. For example, the processor 201 in FIG. 2 may invoke the computer-executable instructions stored in the memory 203, to enable the communication apparatus 70 to perform the method in the foregoing method embodiments.

For example, functions/implementation processes of the processing module 701 and the transceiver module 702 in FIG. 7 may be implemented by the processor 201 in FIG. 2 by invoking the computer-executable instructions stored in the memory 203. Alternatively, functions/implementation processes of the processing module 701 in FIG. 7 may be implemented by the processor 201 in FIG. 2 by invoking the computer-executable instruction stored in the memory 203, and functions/implementation processes of the transceiver module 702 in FIG. 7 may be implemented by the communication interface 204 in FIG. 2.

The foregoing descriptions about implementations allow a person skilled in the art to clearly understand that, for the purpose of convenient and brief description, division of the foregoing functional modules is used as an example for description. During actual application, the foregoing functions can be allocated to different modules and implemented based on a requirement, that is, an inner structure of an apparatus is divided into different functional modules to implement all or some of the functions described above.

In the several embodiments provided in this application, it should be understood that the disclosed apparatus and method may be implemented in other manners. For example, the described apparatus embodiment is merely an example. For example, the module or unit division is merely logical function division and may be other division during actual implementation. For example, a plurality of units or components may be combined or integrated into another apparatus, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may be one or more physical units, may be located in one place, or may be distributed in different places. Some or all of the units may be selected based on actual requirements to achieve the objectives of the solutions of embodiments.

In addition, functional units in embodiments of this application may be integrated into one processing unit, each of the units may exist independently physically, or two or more units may be integrated into one unit. The integrated unit may be implemented in a form of hardware, or may be implemented in a form of a software functional unit.

When the integrated unit is implemented in the form of a software functional unit and sold or used as an independent product, the integrated unit may be stored in a readable storage medium. Based on such an understanding, the technical solutions in embodiments of this application essentially, or the part contributing to the conventional technology, or all or some of the technical solutions may be implemented in the form of a software product. The software product is stored in a storage medium and includes several instructions for instructing a device (which may be a single-chip microcomputer, a chip, or the like) or a processor (processor) to perform all or some of the steps of the methods described in embodiments of this application. The foregoing storage medium includes any medium that can store program code, such as a USB flash drive, a removable hard disk, a ROM, a RAM, a magnetic disk, or an optical disc.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. An apparatus, comprising:
a communication interface; and
at least one processor, configured to:
receive first indication information from a network device, wherein the first indication information indicates a first cell for sending a first physical uplink control channel (PUCCH), and the first cell is comprised in M cells, wherein each cell of the M cells has a PUCCH transmission capability and the M cells are comprised in a PUCCH group, and M is an integer greater than 1;
receive second indication information from the network device, wherein the second indication information indicates a time domain position of the first PUCCH; and send the first PUCCH to the network device on the first cell in the time domain position of the first PUCCH; and wherein the second indication information comprises first position information and time interval information, the first position information indicates a time domain position for transmitting a physical downlink shared channel (PDSCH), and the time interval information indicates a time interval between a moment for transmitting the PDSCH and a moment for transmitting the first PUCCH.

2. The apparatus according to claim 1, wherein configuration information for PUCCH transmission is respectively configured for each cell of the M cells.

3. The apparatus according to claim 2, wherein each configuration information for PUCCH transmission comprises a first set, and each first set comprises at least one time interval; and wherein:

a quantity of time intervals comprised in each first set corresponding to the M cells is the same; or a quantity of bits occupied by the time interval information of each configuration information is determined by a quantity of time intervals comprised in a second set, and the second set comprises a largest quantity of time intervals in the first sets corresponding to the M cells.

4. The apparatus according to claim 1, wherein the at least one processor is further configured to:

receive third indication information from the network device, wherein the third indication information indicates a time domain position of a second PUCCH; and send the second PUCCH to the network device based on the third indication information.

5. The apparatus according to claim 4, wherein sending the second PUCCH to the network device based on the third indication information comprises:

when the second PUCCH and the first PUCCH are located in a same time unit, and a sending moment of the third indication information is earlier than a sending moment of the second indication information, sending, on the first cell, the second PUCCH to the network device at the time domain position indicated by the second indication information; or when the second PUCCH and the first PUCCH are located in a same time unit, and a sending moment of the third indication information is later than a sending moment of the second indication information, sending, on a preset cell, the second PUCCH to the network device at the time domain position indicated by the third indication information; or when the second PUCCH and the first PUCCH are located in different time units, sending, on a preset cell, the second PUCCH to the network device at the time domain position indicated by the third indication information.

6. The apparatus according to claim 1, wherein a quantity of bits occupied by the first indication information is associated with M in an association relationship; or a quantity of bits occupied by the first indication information is determined by the network device.

7. The apparatus according to claim 6, wherein a quantity Q of cells that are able to be indicated by the first indication information is less than M, and the at least one processor is further configured to:

determine at least one second cell from the M cells, wherein a time unit corresponding to the at least one second cell comprises at least R non-downlink symbols at the time domain position indicated by the second indication information, and the first cell is comprised in the at least one second cell, and wherein R and Q are positive integers.

8. The apparatus according to claim 7, wherein a quantity of the at least one second cell is greater than Q, and an index of the first cell in the at least one second cell is less than or equal to Q.

9. The apparatus according to claim 1, wherein a quantity of bits occupied by the first indication information is associated with M in an association relationship.

10. An apparatus, comprising:

a communication interface; and at least one processor, configured to:

send first indication information to a terminal, wherein the first indication information indicates a first cell for sending a first physical uplink control channel (PUCCH), and the first cell is comprised in M cells, wherein each cell of the M cells has a PUCCH transmission capability and the M cells are comprised in a PUCCH group, and M is an integer greater than 1;

send second indication information to the terminal, wherein the second indication information indicates a time domain position of the first PUCCH; and receive the first PUCCH from the terminal on the first cell in the time domain position of the first PUCCH; and wherein the second indication information comprises first position information and time interval information, the first position information indicates a time domain position for transmitting a physical downlink shared channel (PDSCH), and the time interval information indicates a time interval between a moment for transmitting the PDSCH and a moment for transmitting the first PUCCH.

11. The apparatus according to claim 10, wherein the at least one processor is further configured to:

configure, to the terminal, configuration information for PUCCH transmission respectively for each cell of the M cells.

12. The apparatus according to claim 11, wherein each configuration information for PUCCH transmission comprises a first set, and each first set comprises at least one time interval; and wherein:

a quantity of time intervals comprised in each first set corresponding to the M cells is the same; or a quantity of bits occupied by the time interval information of each configuration information is determined by a quantity of time intervals comprised in a second set, and the second set comprises a largest quantity of time intervals in first sets corresponding to the M cells.

13. The apparatus according to claim 10, wherein a quantity of bits occupied by the first indication information is associated with M in an association relationship.

14. The apparatus according to claim 13, wherein the quantity P of bits occupied by the first indication information satisfies a formula: $P=\lceil \log_2 M \rceil$.

15. The apparatus according to claim 13, wherein a quantity Q of cells that are able to be indicated by the first indication information is less than M, and the at least one processor is further configured to:

determine at least one second cell from the M cells, wherein a time unit corresponding to the at least one second cell comprises at least R non-downlink symbols at the time domain position indicated by the second indication information, and the first cell is comprised in the at least one second cell, and wherein R and Q are positive integers.

16. The apparatus according to claim 15, wherein a quantity of the at least one second cell is greater than Q, and an index of the first cell in the at least one second cell is less than or equal to Q.

* * * * *